United States Patent
Choudhary et al.

(10) Patent No.: US 12,530,193 B2
(45) Date of Patent: Jan. 20, 2026

(54) TRACE CACHE TECHNIQUES BASED ON BIASED CONTROL TRANSFER INSTRUCTIONS

(71) Applicant: Apple Inc., Cupertino, CA (US)

(72) Inventors: Niket K. Choudhary, Santa Clara, CA (US); Muawya M. Al-Otoom, Lake Oswego, OR (US); Pruthivi Vuyyuru, Santa Clara, CA (US); Andrew H. Lin, Cupertino, CA (US); Ilhyun Kim, Portland, OR (US); Douglas C. Holman, San Francisco, CA (US); Samir Dutt, San Jose, CA (US); Ronald P. Hall, Cedar Park, TX (US)

(73) Assignee: Apple Inc., Cupertino, CA (US)

( * ) Notice: Subject to any disclaimer, the term of this patent is extended or adjusted under 35 U.S.C. 154(b) by 68 days.

(21) Appl. No.: 18/352,309

(22) Filed: Jul. 14, 2023

(65) Prior Publication Data

US 2025/0021332 A1  Jan. 16, 2025

(51) Int. Cl.
*G06F 9/30* (2018.01)
*G06F 9/38* (2018.01)

(52) U.S. Cl.
CPC ........ *G06F 9/30032* (2013.01); *G06F 9/3808* (2013.01); *G06F 9/3844* (2013.01)

(58) Field of Classification Search
CPC ... G06F 9/30032; G06F 9/3808; G06F 9/3844
See application file for complete search history.

(56) References Cited

U.S. PATENT DOCUMENTS 6,014,742 A * 1/2000 Krick .................... G06F 9/3808
                                                              712/236
6,055,630 A   4/2000 D'Sa et al.
(Continued)

FOREIGN PATENT DOCUMENTS

TW          I450547 B      8/2014

OTHER PUBLICATIONS

International Search Report and Written Opinion in PCT Appl. No. PCT/US2024/036352 mailed Oct. 23, 2024, 9 pages.

*Primary Examiner* — Corey S Faherty
(74) *Attorney, Agent, or Firm* — Kowert, Hood, Munyon, Rankin & Goetzel, P.C.; Michael B. Davis; Dean M. Munyon

(57) ABSTRACT

Disclosed techniques relate to trace cache circuitry configured to identify and cache traces that satisfy certain criteria. Prediction circuitry may track directions of executed control transfer instructions, including a first category of control transfer instructions that meet a first threshold bias level toward a given direction (which may be referred to as "stable") and a second category of control transfer instructions that do not meet the first threshold bias level (which may be referred to as "unstable"). Trace cache circuitry may identify traces of instructions that satisfy a set of criteria, including: only control transfer instructions of the first category are allowed as internal control transfer instructions and a control transfer instruction in the second category is allowed only at an end of a given trace. Disclosed techniques may advantageously provide performance and power advantages of trace caching with reduced complexity, relative to certain traditional trace caches.

19 Claims, 18 Drawing Sheets

(56) References Cited

U.S. PATENT DOCUMENTS

| | | | |
|---|---|---|---|
| 6,101,577 | A | 8/2000 | Tran |
| 6,351,844 | B1 | 2/2002 | Bala |
| 6,785,801 | B2 * | 8/2004 | Duesterwald ....... G06F 9/45504 |
| | | | 712/209 |
| 7,406,585 | B2 * | 7/2008 | Rose .................... G06F 9/3861 |
| | | | 712/205 |
| 7,949,854 | B1 * | 5/2011 | Thaik ................... G06F 9/3812 |
| | | | 712/208 |
| 7,953,933 | B1 | 5/2011 | Thaik et al. |
| 10,209,993 | B2 * | 2/2019 | Wang ................. G06F 12/0875 |
| 10,747,539 | B1 | 8/2020 | Hakewill et al. |
| 2001/0049782 | A1 | 12/2001 | Hsu et al. |
| 2004/0154011 | A1 | 8/2004 | Wang et al. |
| 2004/0193857 | A1 | 9/2004 | Miller et al. |
| 2005/0125632 | A1 | 6/2005 | Alsup et al. |
| 2005/0138341 | A1 | 6/2005 | Maiyuran et al. |
| 2005/0149709 | A1 | 7/2005 | Jourdan |
| 2007/0083735 | A1 | 4/2007 | Glew |
| 2007/0162895 | A1 | 7/2007 | Altman et al. |
| 2008/0086597 | A1 | 4/2008 | Davis et al. |
| 2008/0114964 | A1 | 5/2008 | Davis et al. |
| 2011/0078425 | A1 | 3/2011 | Shah et al. |
| 2012/0117362 | A1 | 5/2012 | Bhargava et al. |
| 2014/0075156 | A1 | 3/2014 | Blasco-Allue et al. |
| 2014/0082327 | A1 | 3/2014 | Ghose |
| 2015/0046682 | A1 | 2/2015 | Heil et al. |
| 2015/0205725 | A1 | 7/2015 | Al-Otoom et al. |
| 2017/0102949 | A1 | 4/2017 | Khot et al. |
| 2017/0277538 | A1 | 9/2017 | Friedmann et al. |
| 2018/0285114 | A1 | 10/2018 | Shah et al. |
| 2020/0167164 | A1 | 5/2020 | Jarvis et al. |
| 2021/0382718 | A1 | 12/2021 | Agrawal et al. |
| 2023/0023860 | A1 | 1/2023 | Holman et al. |

\* cited by examiner

TRACE CACHE TECHNIQUES BASED ON BIASED CONTROL TRANSFER INSTRUCTIONS

CROSS REFERENCE TO RELATED APPLICATIONS

This application is related to the following U.S. applications filed on Jul. 14, 2023: U.S. application Ser. No. 18/352,323, U.S. application Ser. No. 18/352,326, U.S. application Ser. No. 18/352,351. Each of the above-referenced applications is hereby incorporated by reference as if entirely set forth herein.

BACKGROUND

Technical Field

This disclosure relates generally to computer processor architecture and more particularly to trace cache circuitry.

Description of Related Art

Trace caches store traces of instructions, where a trace typically includes at least one internal taken branch and may end with a branch. Trace caches may substantially improve performance by increasing instruction fetch bandwidth (relative to fetching multiple times from an instruction cache) and also may reduce fetch power consumption. It may be costly when a branch unexpectedly exits a trace in the trace cache, however, and a trace cache and its control circuitry may utilize substantial processor area and power. These tradeoffs have impeded practical trace cache implementations in traditional processor designs.

DETAILED DESCRIPTION

Overview and Brief Outline of Disclosure

Figure 5:
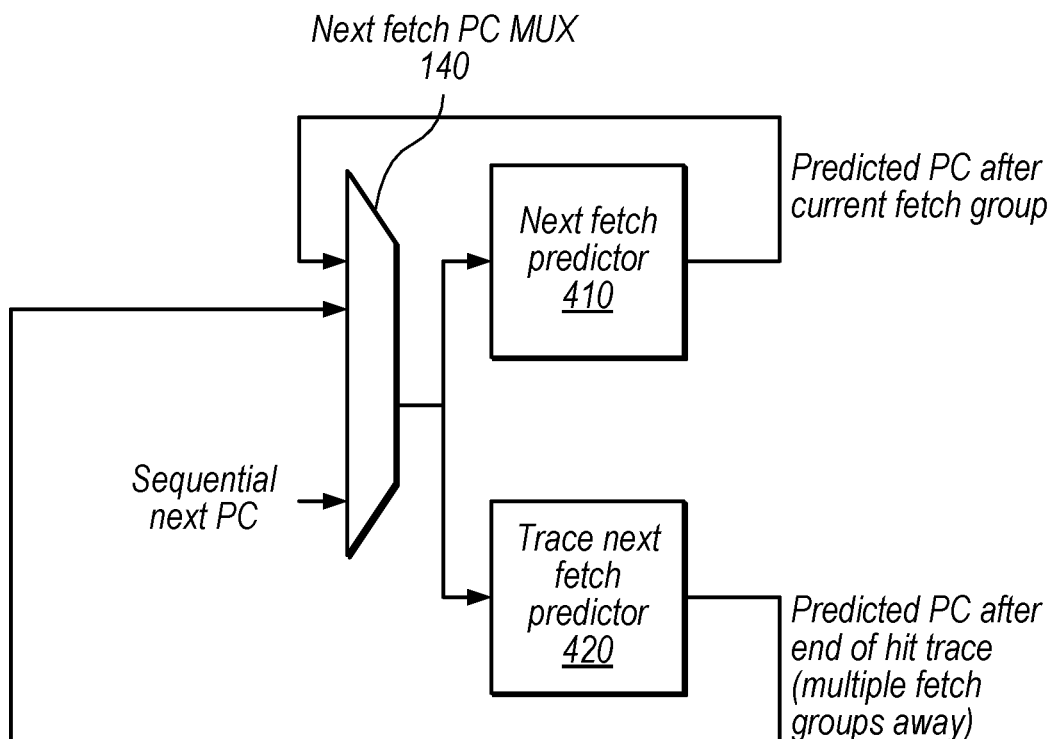
FIG. 5 is a block diagram illustrating an example trace next fetch predictor, according to some embodiments.
Figure 6:
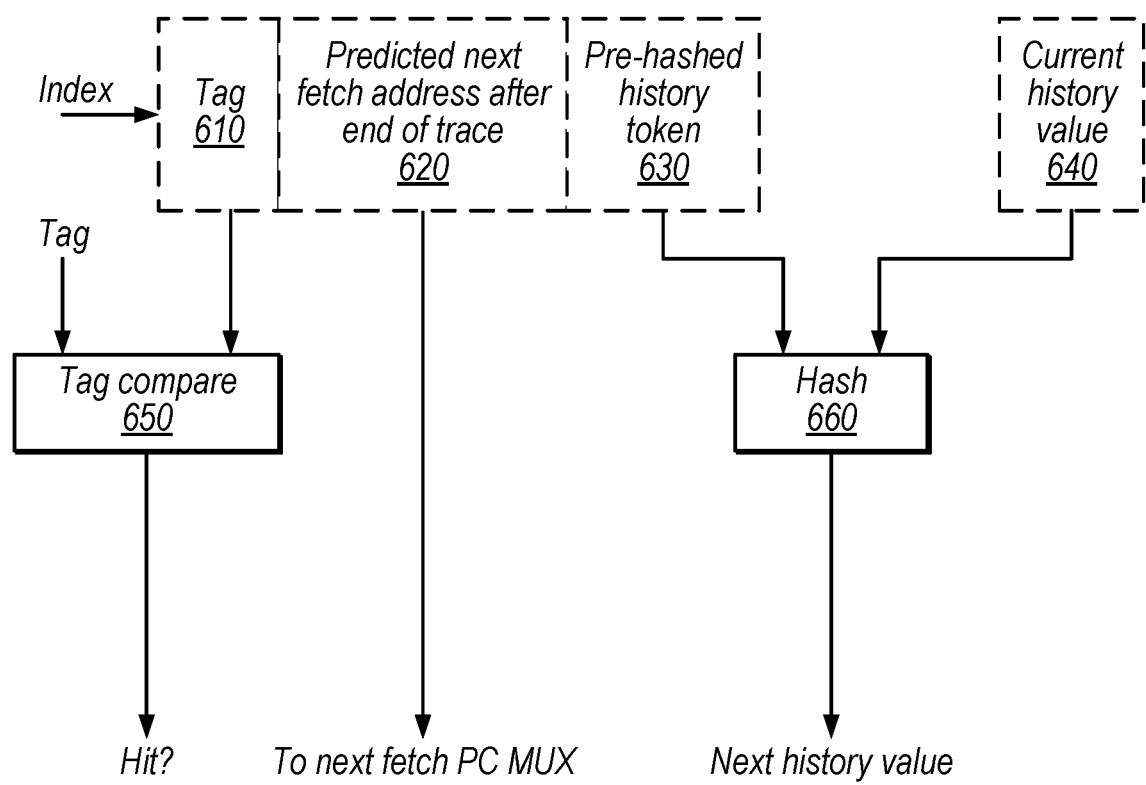
FIG. 6 is a block diagram illustrating an example pre-hashed branch history token, according to some embodiments.
Figure 7:
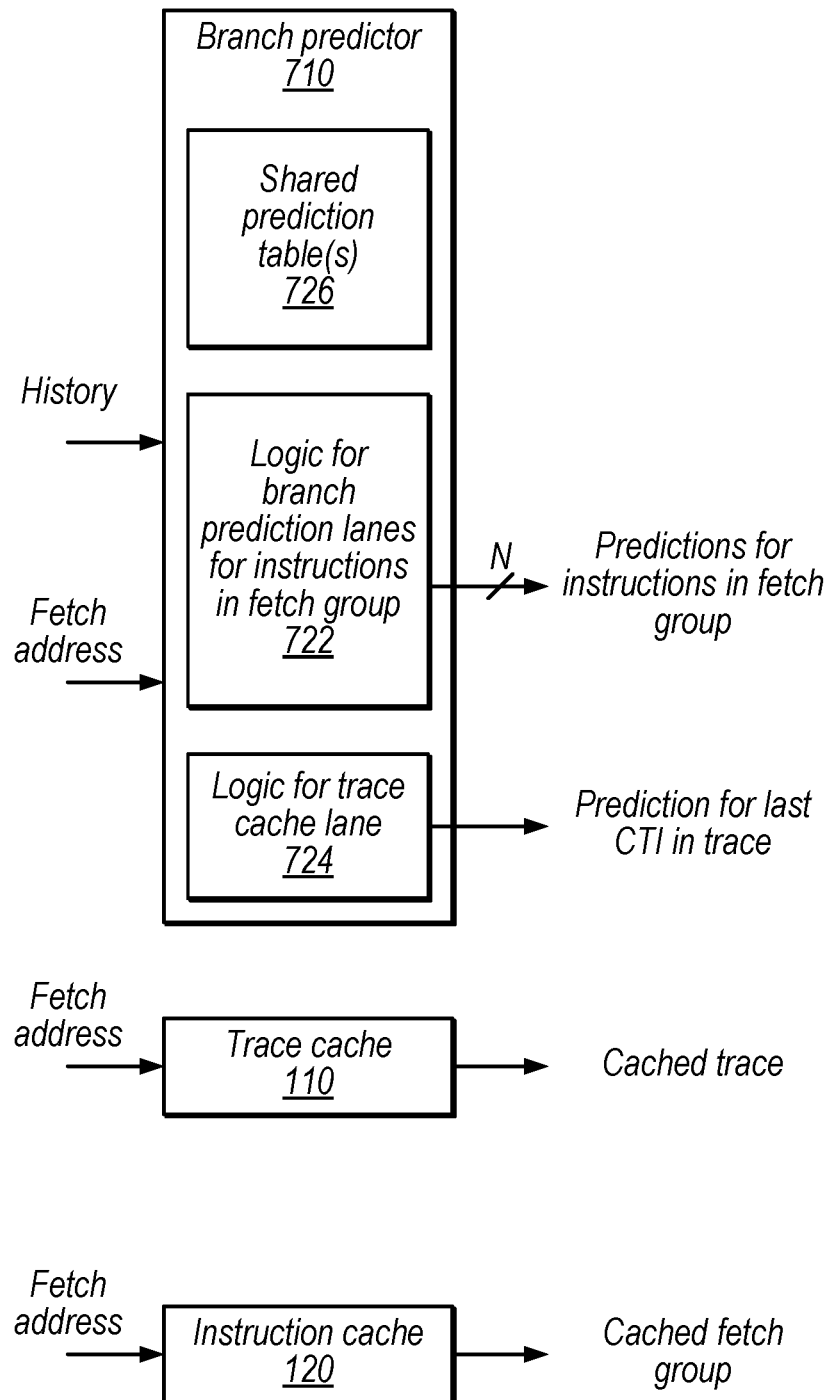
FIG. 7 is a block diagram illustrating an example trace prediction lane for a branch predictor with shared resources, according to some embodiments.
Figure 8:
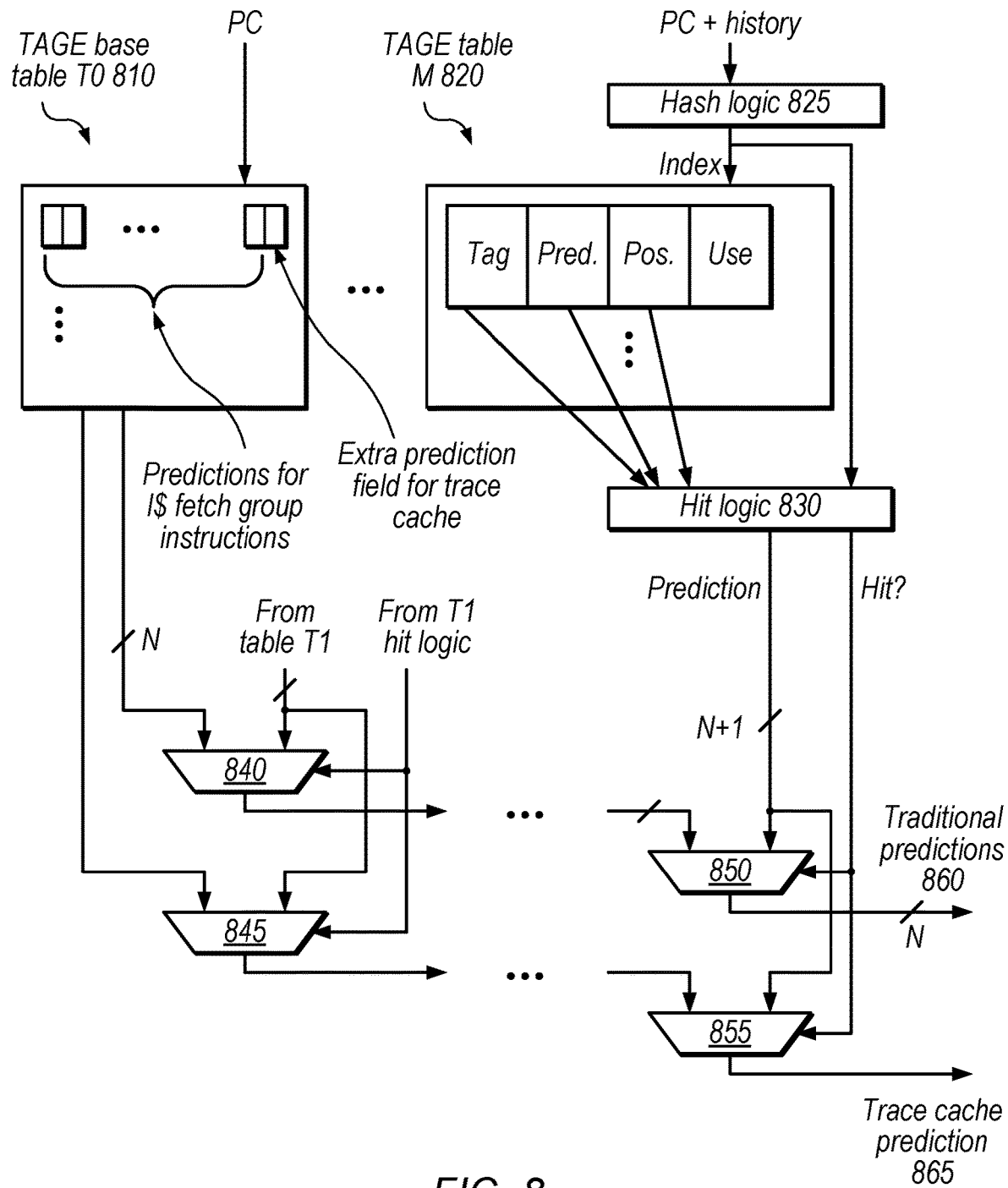
FIG. 8 is a block diagram illustrating an example trace prediction lane for a tagged geometric length (TAGE) predictor, according to some embodiments.

In various embodiments discussed in detail below, control circuitry for a trace cache is configured to assemble traces of instructions that meet certain criteria. For example, the control circuitry may restrict internal conditional branches to "stable" branches that meet a bias threshold toward one direction. "Internal" branches refer to branches that are not the last instruction in a trace. The following section provides a brief introduction to various disclosed techniques relating to a stable trace cache. FIGS. 1-4 show example trace cache implementations. FIGS. 5-6 relate to a next fetch predictor configured to operate in conjunction with trace cache hits. FIGS. 7-8 show logic for an extra trace cache lane for a branch predictor. FIGS. 9-12 relate to allowing less stable internal branches within a trace, in certain scenarios. The remaining figures show example methods, devices, and systems.

In disclosed embodiments, trace cache circuitry is configured to cache only traces with internal control transfer instructions that meet certain criteria. For example, the concept of a "stable" branch may improve trace cache performance. Restrictions on internal branches may advantageously reduce the size of the trace cache needed to achieve a given performance level. For example, for an instruction sequence with a branch that is evenly biased (50% taken and 50% not taken during execution), a trace may be cached for each branch direction to achieve desired performance. If those traces in turn include another internal branch that is also unstable, four traces might be cached, and so on. In contrast, a single trace with multiple stable branches may provide substantial performance increases, even without caching other overlapping traces. Restricting internal branches may also improve the likelihood that the entire trace will be executed when there is a hit in the trace cache (as opposed to performing a front-end redirect if any of the internal branches have a different direction than expected for the trace). Further, restricting internal branches may reduce complexity on the critical path of the processor. In some embodiments, while only stable branches are allowed as internal branches in a trace, the trace may end on a non-branch instruction, an unstable branch, or a stable branch.

As used herein, the phrases "stable branch" and "stable control transfer instruction" refer to a control transfer instruction that control circuitry has determined to treat as unconditional during a period of time, based on its execution history, even though the control transfer instruction may be conditional. Said another way, based on their historical execution, some conditional control transfer instructions have been promoted to a "stable" status. In disclosed embodiments, these control transfer instructions may be predicted based on that status and the stable status may be a criteria for inclusion within a trace cache trace. Designating a conditional control transfer instruction as stable/biased is a dynamic form of prediction that is dependent upon runtime behavior of the instruction, not a static prediction that could be performed independently of instruction execution (e.g., at compile time).

For example, control circuitry may designate a conditional branch that has always been taken (or always not taken) during execution as stable, because it was 100% biased during observed execution. In some embodiments, branches that meet a lower threshold such as 95% biased, 98% biased, 99.5% biased, etc. over some time period are considered stable. Once a branch is designated as biased/stable, a biased branch predictor is configured to always predict those branches to execute in the direction of the historical bias, in some embodiments (e.g., for a branch that was 99% taken during execution and which control circuitry has designated as stable, a biased predictor may predict the branch to be taken for every execution of the branch under the stable designation). Branch predictions for stable branches typically have a relatively high confidence level.

In some embodiments, a control transfer instruction that is initially not designated as stable could transition to a stable state based on its execution behavior. For example, if the control transfer instruction is a conditional branch instruction that is initially taken, it may be designated as stable, and thereafter treated as an unconditional taken branch. If on some later occasion, the branch instruction is determined to be not taken when executed, it may transition to an unstable state. In other embodiments, other criteria may be used to determine the transition into and out of the stable state. For example, the behavior of multiple instances of instruction execution may be considered before transitioning into or out of the stable state. Thus, for the period of time between when a control transfer instruction is designated as stable until this designation is removed, the control transfer instruction may be treated as unconditional. During this period, other forms of prediction, if available, may not be utilized. Once a control transfer instruction is no longer in a stable state, other types of predictors may be used to predict the instruction's behavior.

Note that unconditional branches or other unconditional control transfer instructions may classified and processed as stable based on their nature (rather than dynamically determined to be stable). Therefore, disclosed techniques may classify all or a subset of the following example instructions as stable: unconditional control transfer instructions (e.g., B or BL instructions), conditional control transfer instructions (e.g., CBR instructions) that satisfy a bias threshold, indirects (e.g., BR or BLR instructions) that satisfy a bias threshold, and returns that satisfy a bias threshold. Conditionals, indirects, returns, etc. that do not satisfy a bias threshold may be considered unstable.

As used herein, the phrases "control transfer instruction," "program flow instruction" and "branch instruction" may be used interchangeably. Such instructions include at least conditional branch instructions, call instructions, return instructions, jump instructions, etc. Additionally, while the term "branch instruction" (or more briefly, "branch") may be used throughout this disclosure for convenience, it should be understood that the term applies to any type of control transfer instruction that may be utilized in an instruction set architecture.

In some embodiments, a separate biased branch predictor provides predictions for biased branches. For example, U.S. patent application Ser. No. 17/590,719 filed on Feb. 2, 2022 and titled "Conditional Instructions Prediction" discusses example biased branch predictor circuitry that may be implemented in disclosed embodiments. For example, the '719 application discusses a bias table with entries that tracks whether a given allocated branch is biased over a number of executions of the branch. In other embodiments, stable branches may be predicted by multiple predictors, may be predicted by predictors that also provide predictions for unstable branches, or both.

The biased branch predictor may have priority over other predictions for a given branch. In some embodiments, the biased branch predictor maintains a field per branch (e.g., a bit) that indicates whether the branch has deviated from the expected direction during execution. The biased branch predictor may include a training interval before making predictions for a branch (e.g., such that a given branch must execute at least a threshold number of times before being predicted as biased). Control circuitry may periodically reset the biased branch predictor over relatively long intervals so that conditional branches that only very occasionally take a different direction have a chance to retrain as biased after the reset.

As mentioned above, it may be desirable to consider branches as stable that meet a lower bias threshold than 100%. For relatively high thresholds, the biased branch predictor may maintain a counter per branch that indicates the number of times the executed branch did not have the expected direction. The branch may be considered unstable when this counter meets a threshold number. For lower thresholds (e.g., 95% taken), this approach might utilize a substantial number of counter bits and therefore the biased branch predictor may encode the ratio of taken to not taken using other representations.

As one example, to reduce the circuit area and power used for tracking bias, control circuitry may initially assume that all branches meet a bias threshold. But the control circuitry may implement a usefulness filter to prevent branches that do not actually meet the threshold from being included in traces. For example, control circuitry may maintain a usefulness field and reduce the field by a greater amount, for branches that exit a given trace, than it increases the field for branches whose direction remained within the trace. Filter circuitry may prevent caching of branches that fail to meet a threshold usefulness value (which implies that one or more internal branches failed to meet a bias threshold). For example, the filter circuitry may add those branches to a Bloom filter. The filter may be updated based on buffered traces during training, based on cached traces in the trace cache, or both.

In some embodiments, the "stable" branch designation is split into multiple sub-categories that may be handled differently. For example, control circuitry may allow "less stable before end" (LBE) branches as internal branches within a trace under certain scenarios or conditions. There may be restrictions on the locations within a trace at which a less-stable branch is allowed (e.g., within certain fetch groups). These techniques may improve trace cache coverage and performance with limited tradeoffs in terms of size, unexpected trace exits, etc. Note that branches designated as various stability subcategories may be recategorized based on further execution, similarly to the most stable category.

In some embodiments, a trace next fetch predictor is configured to predict the next fetch address following execution of a trace. The trace next fetch predictor may be a single-cycle predictor. To generate fast predictions, the trace next fetch predictor may utilize a pre-hashed branch history token based on multiple taken branches within a corresponding trace (e.g., because generating multiple history updates for those branches may not be feasible in a single cycle).

In some embodiments, certain branch predictor circuitry is shared for trace-related predictions and other predictions. Note that because a trace may end with an unstable branch, it may be desirable to incorporate that branch in prediction training, predict the direction of that branch, or both. In some embodiments, the branch predictor includes a dedicated prediction lane for trace-ending branch predictions, which may advantageously provide sufficient prediction performance without including a separate branch predictor table for trace-related predictions. For embodiments that allow less-stable internal branches, a given branch predictor table entry and predictor lane may be shared for both instruction cache and trace cache hits, as discussed in detail below with reference to FIG. 12.

Overview of Example Trace Cache and Bias/Stability Criteria

Figure 1:
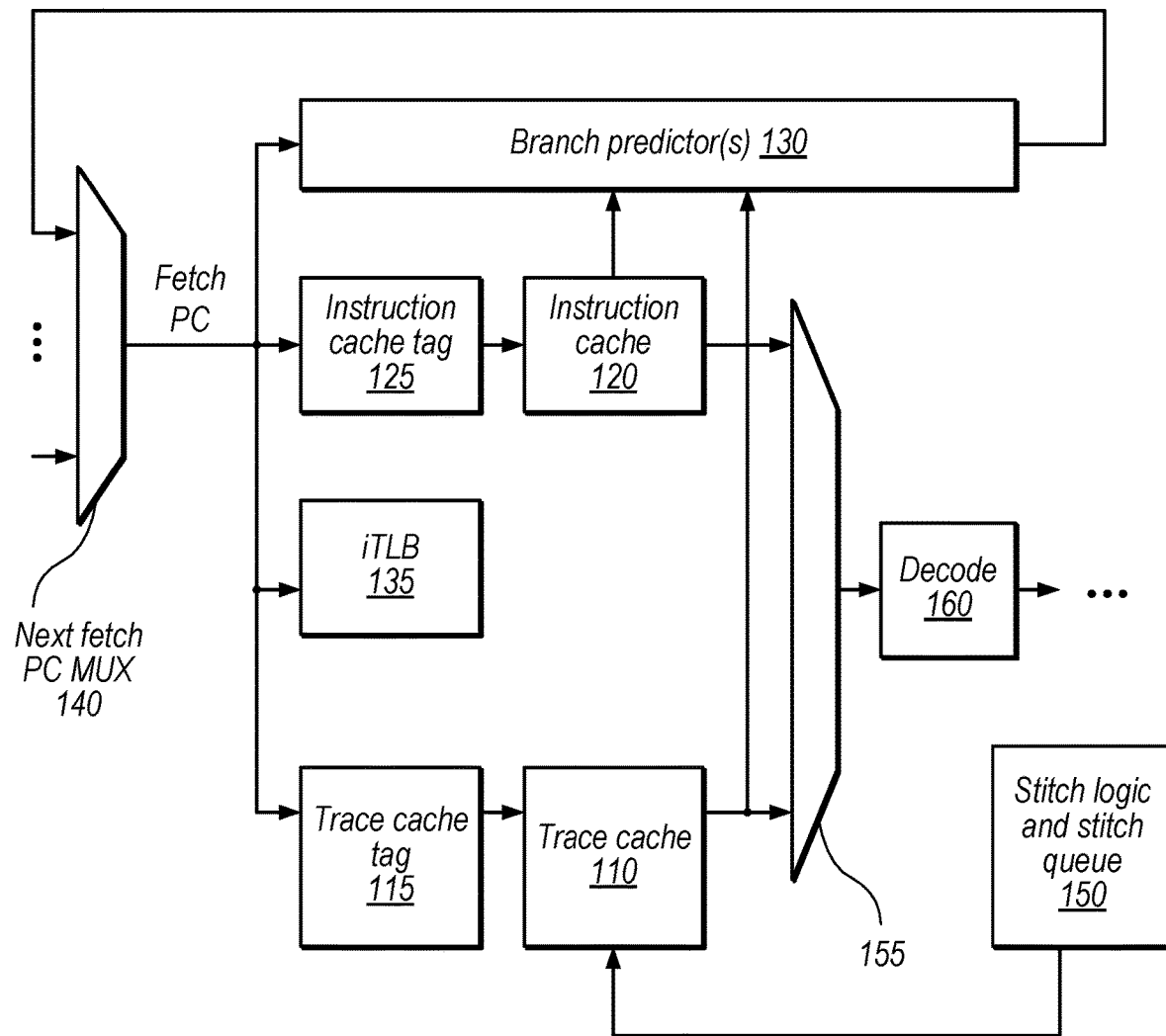
FIG. 1 is a block diagram illustrating an example processor pipeline that includes a trace cache, according to some embodiments.

FIG. 1 is a block diagram illustrating an example processor pipeline that includes a trace cache, according to some embodiments. In the illustrated example, the pipeline includes trace cache circuitry 110, trace cache tag circuitry 115, instruction cache circuitry 120, instruction cache tag circuitry 125, branch predictor(s) 130, instruction translation lookaside buffer (iTLB) 135, next fetch program counter (PC) multiplexer (MUX) 140, stitch logic and stitch queue 150, MUX 155, and decode circuitry 160.

Trace cache 110, in some embodiments, is configured to detect and store traces of instructions that includes at least one internal taken branch. Therefore, a given trace may include multiple basic blocks. A "basic block" is a sequence of instructions with no control transfers in, except to the entry, and no control transfers out, except at the exit. As discussed above, trace cache 110 may impose various conditions on traces, e.g., regarding the types of internal branches allowed, size of trace, number of taken internal branches, number of fetch groups, etc. In some embodiments, trace cache 110 is configured to store traces with multiple internal taken branches. Trace cache 110 may impose restrictions on internal conditional branches, e.g., a threshold bias level as discussed above. Trace cache 110 may cache only a trace corresponding to the biased direction of a given internal branch and not cache traces corresponding to other directions of the internal branch.

Trace cache tag circuitry 115, in some embodiments, is configured to store tag information (e.g., all or a portion of the corresponding fetch PC) for entries in trace cache 110. Fetch PCs that match a tag may result in a hit in tag circuitry 115 and may cause decode unit 160 to utilize instructions from a corresponding trace in trace cache 110, via MUX 155. Note that various other information may also be used to tag the trace cache, such as global history, path history, other branch history encodings, etc.

Stitch logic and stitch queue circuitry 150, in some embodiments, is configured to identify traces that satisfy conditions for caching in trace cache 110. Circuitry 150 may also buffer/queue traces until they are ready for caching (e.g., during a training interval). Circuitry 150 may also stitch fetch groups to generate a trace for caching. This may include selecting different portions of fetch groups or cache lines from the instruction cache (e.g., a portion up to and including a taken branch, a portion starting with a target of a taken branch, etc.) such that a trace does not include instructions that are not predicted to be included in the trace. Therefore, instructions of the trace may be stored sequentially in the trace, even though their program counters may not be sequential.

In some embodiments, circuitry 150 is configured to buffer fetch groups received from instruction cache 120 from which to stitch traces (and not buffer instructions from trace cache 110). Circuitry 150 may also perform training on candidate traces to determine whether they should be promoted within trace cache 110 (or promoted to trace cache 110 from a separate buffer).

In some embodiments, circuitry 150 utilizes a rolling window technique to identify traces. Circuitry 150 may impose various constraints on formed traces based on various criteria discussed herein. In rolling window implementations, queue circuitry may buffer multiple partially-overlapping traces (e.g., where one trace includes fetch groups A, B, and C and another trace includes fetch groups B, C, and D) and may select from among overlapping traces for promotion to an active state in trace cache 110 based on usefulness counters for different traces. (Alternatively, control circuitry may select from among overlapping traces based on various criteria such as earliest first fetch group, etc.). In some embodiments, circuitry is configured not to promote overlapping traces in the trace cache 110. This may advantageously provide substantial performance benefits associated with caching traces while limiting the size of the trace cache, relative to traditional techniques.

In the illustrated example, traces are identified post-decode for potential caching in trace cache 110. In other embodiments, traces may be identified earlier in the pipeline. Later identification, however, may allow traces to be less speculative (e.g., because any front-end redirects may have already been performed before trace formation). Note that trace cache 110 stores instructions pre-decode in the illustrated example, but similar trace caches may store decoded instructions in other embodiments.

Instruction cache 120, in some embodiments, is configured to cache instructions. Cache 120 may store multiple instructions in a given instruction cache line (e.g., corresponding to a fetch group width). In some embodiments, instructions are stored sequentially on a given cache line. Therefore, a branch on a given cache line may be followed by instructions on the fall-through path. In contrast, a cached trace in trace cache 110 may include instructions on a predicted-taken path immediately following a predicted-taken branch.

Instruction cache tag circuitry 125, in some embodiments, is configured to store tag information (e.g., all or a portion of the corresponding fetch group PC) for entries in instruction cache 120. When there are hits in both the trace cache 110 and the instruction cache 120, arbitration circuitry may prioritize the trace cache (e.g., via MUX 155). Note that a portion of the fetch group PC is also used to index into the trace cache 110, instruction cache 120, or both in some embodiments (and the index bits may be the same or may be different for the different caches).

Control circuitry may temporarily power down or otherwise reduce the power/performance state of instruction cache 120, instruction cache tag circuitry 125, or both in response to a hit in the trace cache 110. In other embodiments, instruction cache circuitry may remain powered on, e.g., in order to fetch further ahead of the end of a trace in the trace cache.

iTLB circuitry 135, in some embodiments, is configured to store translations from a virtual memory space to a physical memory space for instruction accesses. Hits in iTLB 135 may allow fast access to translation information, in contrast to performing a page walk to generate a translation on a miss. The output of iTLB circuitry 135 may be used to retrieve instructions for storage in instruction cache 120, trace cache 110, or both, in certain scenarios. In the illustrated embodiment, trace cache 110 and instruction cache 120 are virtually tagged, but in other embodiments one or both of these caches are physically tagged. Various caches discussed herein may be included in a cache/memory hierarchy that includes one or more higher-level caches and a system memory.

Branch predictor(s) 130, in some embodiments, include circuitry configured to predict the direction of conditional control transfer instructions. In some embodiments, a processor includes multiple branch predictors. Different predictors may be configured to provide predictions in different pipeline stages (e.g., a next fetch predictor may be a single-cycle predictor while other predictors may generate predictions over multiple cycles). As briefly mentioned above, branch predictor(s) 130 train based on results of executed control transfer instructions, including control transfer instructions stored as part of a trace, in some embodiments. In embodiments that fetch multiple instructions per cycle, a given branch predictor 130 may implement multiple lanes to provide separate predictions for the case where a fetch group includes multiple conditional control transfer instructions. In some embodiments, branch predictor(s) 130 include a bias branch predictor configured to provide predictions for biased branches. Detailed examples of branch predictor circuitry in the context of a trace cache are discussed below with reference to FIGS. 5-8 and 12.

Next fetch PC MUX 140, in some embodiments, is configured to select the next fetch PC from among multiple input options. For example, the inputs may include the next sequential PC (e.g., the current PC+the fetch group size), inputs from multiple branch predictors, etc. In some embodiments, arbitration circuitry is configured to control MUX 140 to select an input when multiple branch predictors provide different predicted fetch PCs. When the fetch PC from MUX 140 is mispredicted, instructions may be flushed and replayed from the misprediction point. Similarly, when there is an internal control transfer instruction that exits a cached trace in trace cache 110 (taking an unexpected direction), the pipeline may flush and replay instructions from that point.

Decode circuitry 160, in some embodiments, is configured to at least partially decode fetched instructions provided by MUX 155. Decode circuitry 160 may be configured to decode multiple instructions in a fetch group from a given source in a given cycle. MUX 155 may select the output of trace cache 110 on a trace cache hit.

Note that there may be multiple critical paths in the illustrated example, e.g., from a branch mispredict to the next fetch PC MUX 140, a loop from a next fetch predictor (discussed below with reference to FIG. 4) and the input to the next fetch predictor, find-first-taken logic and redirect control based on i-cache and branch predictor information, writes into an instruction buffer (which may be included between caches 110/120 and decode unit 160, although not explicitly shown), etc. Various disclosed techniques discussed in detail below may allow fetching past the first taken branch without substantially affecting such critical paths.

Figure 2A:
FIG. 2A is a diagram illustrating example branch stability categories, according to some embodiments.

FIG. 2A is a diagram illustrating example stability categories, according to some embodiments. Note that greater or smaller numbers of categories/sub-categories may be defined and handled differently in other embodiments. FIG. 2A shows a spectrum of "biasness" of branches from never taken to always taken. As shown, branches that are almost never taken or almost always taken are designated as stable (the actual thresholds may vary, and some embodiments may consider only 100% biased branches to be stable).

Figure 9:
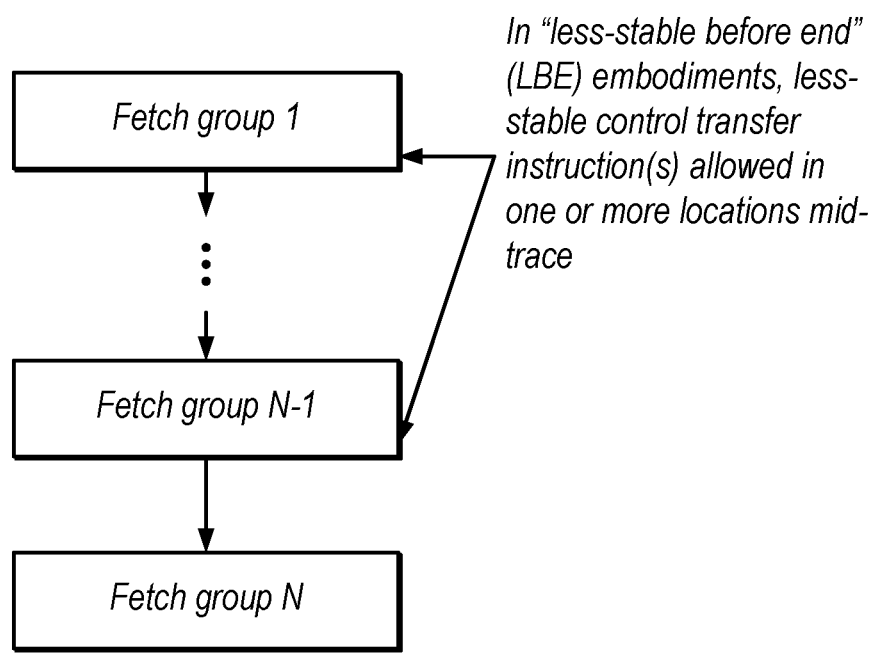
FIG. 9 is a diagram illustrating example relaxed conditions to allow a less-stable control transfer instruction before the end of a trace, according to some embodiments.

Branches that are not in the stable category but are still close to one end of the spectrum may still be designated as "less stable" and may be candidates for less-stable before end (LBE) techniques as discussed in detail below with reference to FIG. 9. In these embodiments, branches that have historically executed in the LBE range are allowed at one or more positions within a trace (although those position (s) may be restricted). This may allow the trace cache to cache more traces relative to more strict implementations, without substantially increasing trace cache size or the misprediction rate of internal trace branches.

Note that some embodiments may consider only branches that are biased in one direction (e.g., biased taken) for inclusion in traces while other embodiments may consider branches that are biased in either direction.

Figure 2B:
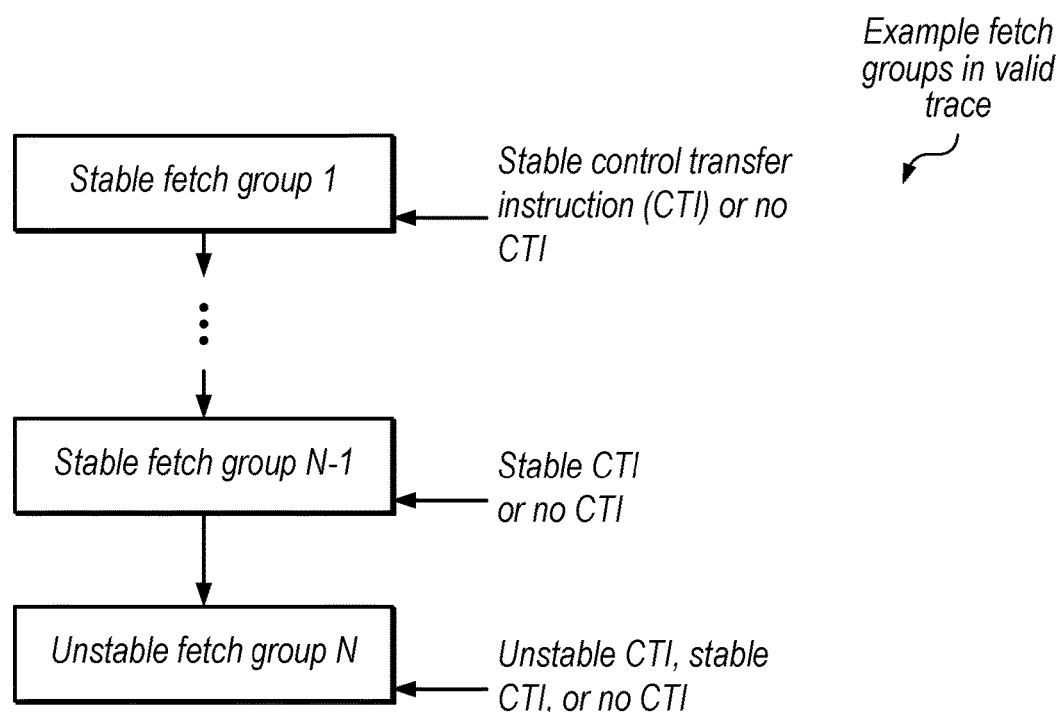
FIG. 2B is a diagram illustrating example stable/unstable fetch group positions allowed in a trace, according to some embodiments.

FIG. 2B is a diagram illustrating example stable/unstable fetch group positions allowed in a trace, according to some embodiments. In the illustrated example, a trace includes N fetch groups. In this embodiment, only stable control transfer instructions are allowed internally, while unstable control transfer instructions are allowed to terminate a trace (although traces may also end on another type of instruction, e.g., when the trace size is reached). As discussed above, this may advantageously reduce situations where all instructions in a cached trace are not actually in the proper execution path, relative to implementations that do not differentiate among different categories/stabilities of control transfer instructions.

A processor may implement various criteria for trace building, in some embodiments. For example, in some embodiments a minimum number of taken branches are required to cache a trace. A trace may be allowed to end with a branch that is stable or unstable, which may be part of the trace (or a trace may end with a non-branch instruction). When selecting from among multiple traces in training using rolling window techniques, the size and number of fetch groups of a given trace may be taken into account in addition to its usefulness.

Figure 3:
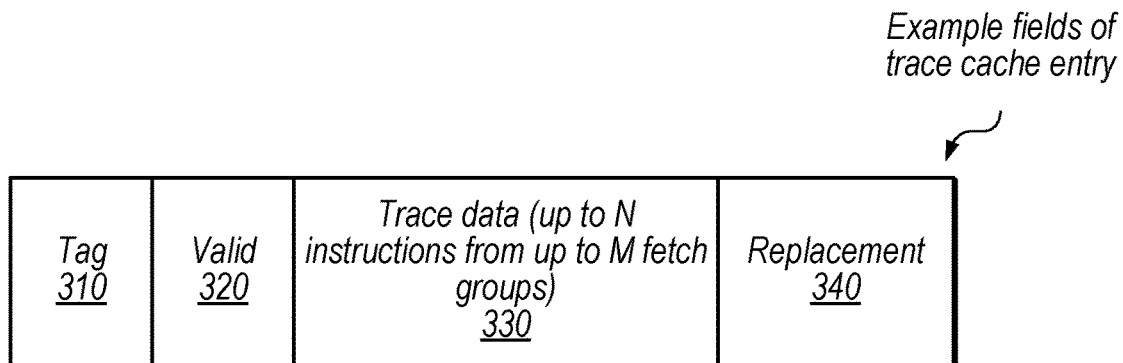
FIG. 3 is a diagram illustrating example fields of a trace cache entry, according to some embodiments.

FIG. 3 is a diagram illustrating example fields of a trace cache entry, according to some embodiments. In the illustrated embodiment a given entry includes a tag field 310 (which may be implemented by circuitry 115), valid field 320, trace data 330, and replacement field 340. In some embodiments, trace cache 110 is direct mapped. In other embodiments, trace cache 110 is set associative or fully associative.

Tag field 310 may include all or a portion of the first fetch group PC (or some value derived therefrom, e.g., according to a hash function). As discussed above, this field may be used to detect hits in the trace cache 110. In various disclosed embodiments, the fetch group PC is used to access trace cache 110 (e.g., to generate index and tag information). In other embodiments, however, various additional information may be used to access a trace cache, such as global history information, signature information, security information, etc.

Valid field 320 indicates whether an entry is currently valid. Entries may be invalidated for various reasons such as failures to execute an entire trace, context switches, coherence requests, self-modifying code, etc. Replacement field 340 may be utilized to select an entry for eviction in certain scenarios.

Trace data 330, in the illustrated example, includes up to N instructions from up to M fetch groups. Note that total number of instructions, number of fetch groups, or both may be restricted in a given implementation. For example, a given embodiment may support 2, 3, 4, 5 etc. fetch groups and up to 8, 16, 32, 64, etc. total instructions in a trace. In some embodiments, a trace cache entry is configured to store targets of all potentially-taken branches in a trace, which may facilitate access to this information if a predicted-not-taken branch ends up exiting the trace.

Replacement field 340, in the illustrated embodiment, represents information used to facilitate eviction decisions, e.g., least-recently-used (LRU) information, usefulness information, etc. A usefulness-based scheme may increase a usefulness value on successful execution of the trace and may reduce the value based on various circumstances (e.g., failure to execute an entire trace on a hit, decay over time, decay based on use of other traces, etc.). When a trace is ready to be promoted to trace cache 110 and a corresponding entry is not available, control circuitry may determine whether to stall promotion of the trace or to evict a current entry to make room for the trace. Replacement field 340 may have a default value on allocation of a trace cache entry and may trigger various actions upon reaching one or more thresholds.

Detailed Example Pipeline

Figure 4:
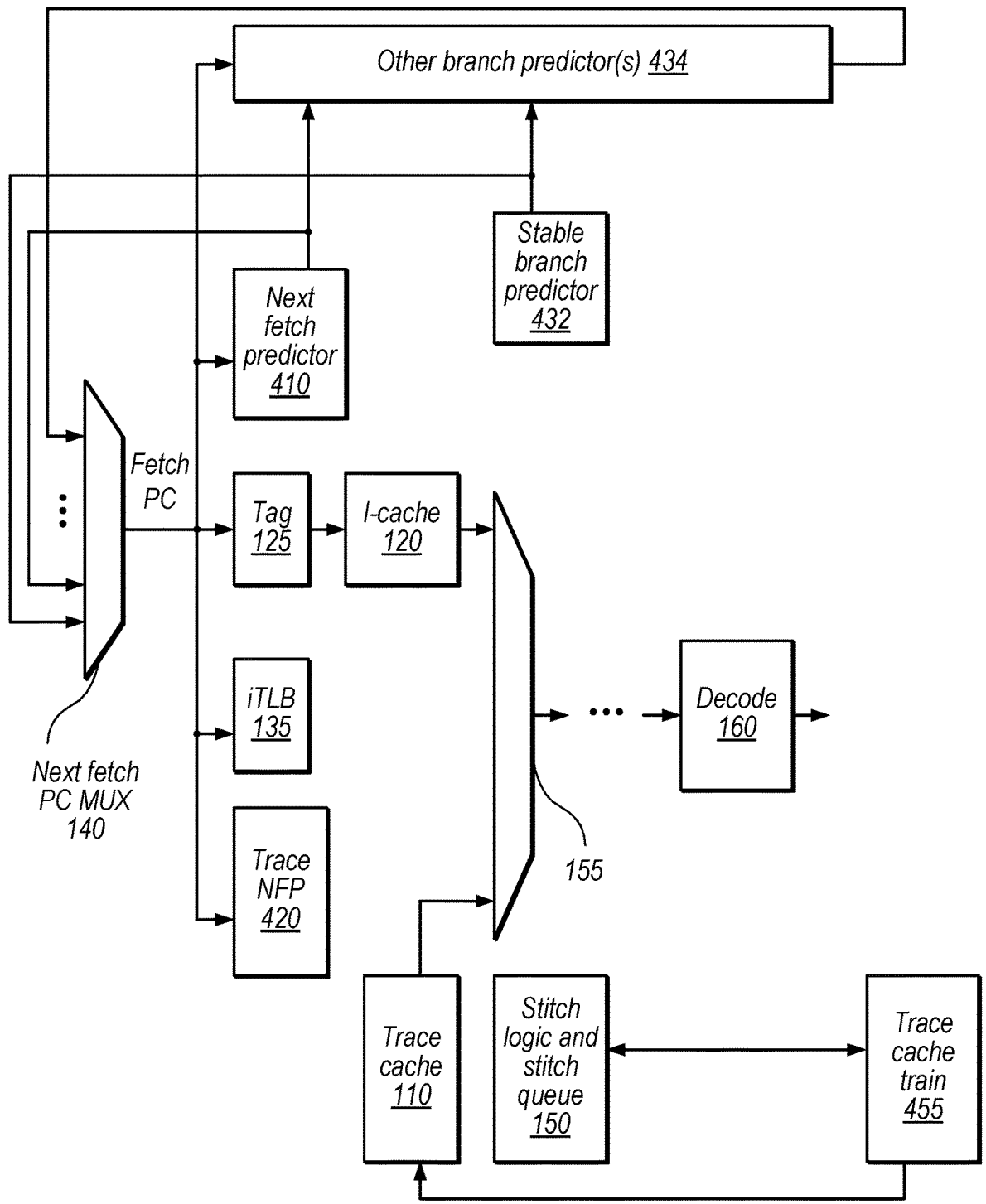
FIG. 4 is a block diagram illustrating a more detailed example pipeline, according to some embodiments.

FIG. 4 is a block diagram illustrating a more detailed example pipeline, according to some embodiments. In the illustrated embodiment, the processor includes various circuitry discussed above with reference to FIG. 1, as well as: next fetch predictor 410, other branch predictor(s) 434, stable branch predictor 432, trace next fetch predictor (NFP) 420, and trace cache train circuitry 455.

Trace cache train circuitry 455, in some embodiments, is configured to interact with stitch logic and stitch queue 150 to determine when to promote traces to trace cache 110. Trace cache train circuitry may enforce various criteria for traces, including size, categories of inner control transfer instructions, etc. In some embodiments, traces being trained are stored in trace cache 110 but are marked as "training" until they reach a usefulness/training threshold (in these embodiments, queue circuitry of element 150 may be omitted). In other embodiments, trace information for traces being trained may be stored in a separate buffer, e.g., in circuitry 150. In some embodiments, replacement field 340 is a usefulness field that is used to select from among multiple partially-overlapping traces for promotion. Generally, traces may be buffered in trace cache 110 or in a separate buffer until they meet a usefulness threshold. At that point, train circuitry 455 may allocate valid entries for those traces, e.g., by moving those traces to the trace cache 110, setting those traces as valid/ready in the trace cache 110 if they are already buffered in a trace cache entry, etc.

Stable branch predictor 432, in some embodiments, is configured to provide predictions for branches that satisfy a bias threshold. In some embodiments, arbitration circuitry (e.g., that controls MUX 140) provides greater priority to predictors from predictor 432 than one or more other predictors, e.g., because biased predictions may have a high confidence level.

The processor also includes multiple next fetch predictors, in the illustrated embodiment. Next fetch predictor 410 and trace NFP 420, in the illustrated embodiment, both provide a predicted next fetch PC to next fetch PC MUX 140 in a given cycle if there are hits in both tables.

Next fetch predictor 410 provides a prediction for a next fetch group after the current fetch group, in some embodiments. Trace next fetch predictor 420, in contrast, provides a prediction for a next fetch group after execution of a trace cache 110, which may therefore be multiple fetch groups away from the previous fetch group in certain scenarios. Detailed example embodiments of trace next fetch predictor 420 are discussed below with reference to FIGS. 5 and 6.

In some embodiments, the illustrated next fetch predictors correspond to different tables of the same next fetch predictor unit. Different next fetch predictors may access tables based on different information, e.g., different portions of a current fetch PC, using history information or not, using signature techniques or not, etc. In some embodiments, trace next fetch predictor 420 has the highest priority among multiple next fetch predictor tables.

Trace Next Fetch Predictor (tNFP)

Generally, a trace next fetch predictor for the trace cache may advantageously provide the next fetch address following the end of the trace (potentially multiple taken branches away from the current fetch address) to allow the front-end to quickly continue fetching proper instructions after a hit in trace cache 110.

FIG. 5 is a block diagram illustrating an example trace next fetch predictor, according to some embodiments. In the illustrated embodiment, the processor includes next fetch predictor 410, trace next fetch predictor 420, and next fetch PC MUX 140. Predictors 410 and 420 may be configured as briefly discussed above with reference to FIG. 4.

As shown, trace next fetch predictor 420 is configured to output a predicted PC after the end of a hit trace in the trace cache, which is multiple fetch groups away from the current PC. This may advantageously improve front-end fetch bandwidth in the context of successful execution of traces. Example formats of entries in circuitry 420 are discussed below with reference to FIG. 6.

Next fetch predictor 410 provides the predicted PC after the current fetch group and next fetch PC MUX 140 selects from among the outputs of circuits 410, 420, and the sequential next PC (although various other inputs to PC MUX 140 are also contemplated). The predicted next PC output for MUX 140 is an input to circuitry 410 and 420 for their next predictions.

In some embodiments, control circuitry is configured to disable reading the instruction cache tag circuitry 125 and instruction cache 120 in response to a hit in the trace next fetch predictor 420, e.g., because a hit in the next fetch predictor may indicate a hit in the trace cache 110.

Note that providing a prediction from the trace next fetch predictor may be challenging in terms of providing a properly-updated history value (e.g., global history, path history, some other history encoding, or some combination thereof). FIG. 6 provides an example technique for pre-calculating information used for generating the history, which may avoid dropping history updates (which may reduce predictor accuracy) without negatively affecting the critical path.

FIG. 6 is a block diagram illustrating example next fetch predictor circuitry and entry fields, according to some embodiments. In the illustrated example, a given entry in trace next fetch predictor 420 includes a tag 610, predicted next fetch address after the end of a corresponding trace 620, and pre-hashed history token 630. In the illustrated example, the processor also maintains current history value 640 and includes tag compare circuitry 650 and hash circuitry 660.

In the illustrated example, a given entry in trace next fetch predictor 420 is accessed based on an index portion of the current fetch PC and tagged (field 610) based on a portion of this PC. Tag compare circuitry 650, in the illustrated embodiment, is configured to indicate a hit or miss in the trace next fetch predictor 420 by comparing one or more tags corresponding to the index (depending on the associativity of the trace next fetch predictor table) to the tag portion of the current fetch PC.

In some embodiments, the index and tag are the same portions of the fetch PC used to access the trace cache 110. In some embodiments, the trace next fetch predictor 420 uses a smaller number of tag bits than the trace cache 110 to reduce circuit area. In other embodiments, entries in trace next fetch predictor 420 may be checked for hits using other information or additional information, such as branch history information, for example.

The predicted next fetch address 620, in some embodiments, is based on a predicted direction of a trace-ending branch, predicted target of a trace-ending branch, or both. The processor front-end may perform various fetch operations (e.g., instruction/trace cache tag checks, etc.) based on this prediction if it wins arbitration at MUX 140. Trace next fetch predictor 420 may update this value based on previous executions of the corresponding trace.

A given entry may also include a valid field indicating validity of an entry, a usefulness field, or both (these fields are not shown in FIG. 6). The usefulness field may be utilized to determine when entries are ready to provide predictions, when to evict entries to make room for another prediction, etc. and may be adjusted based on the accuracy/number of predictions associated with an entry, predictions based on other valid entries, etc.

As briefly mentioned above, it may be challenging to update a branch history value for a next fetch prediction (e.g., in a single cycle). In particular, because a trace may include multiple taken branches, sequentially hashing multiple values to generate an updated history value may have timing effects. Therefore, in some embodiments, the trace next fetch predictor may utilize a pre-hashed branch history token 630 based on multiple branches within a corresponding trace. The processor may compute this value using multiple XOR and shift operations and store the token 630 in a trace next fetch predictor entry in response to caching a trace, for example. The token 630 is one example of branch history update information that may be pre-computed based on multiple taken branches in a trace and provided in response to a predictor hit.

When the trace next fetch predictor 420 wins arbitration, hash circuitry 660 is configured to hash the history token 630 with the current history value (which is up to date at the point of the hit in trace cache 110) to generate the next history value. This next branch history value may be used to access predictor tables in various predictors (including in predictor 420) to generate subsequent predictions.

In some embodiments, there is a 1 to 1 mapping between stable trace cache entries and trace next fetch predictor entries such that a given stable trace cache entries corresponds to a single trace next fetch predictor entry with a prediction for that trace.

Note that branch history may be represented using various formulations. Two examples mentioned above are path history and global history. Generally, path history is generated based on addresses of taken branches and global history is generated based on targets of taken branches. Various embodiments may update path history, global history, or both based on predicted/fetched branches.

Note that a given branch history update may require hashing a relatively small subset of the bits of the previous value with a new value. Therefore, the size of the token 630 may be substantially less than the size of the current history value 640, reducing the area of the trace next fetch predictor table relative to storing a complete updated history value. In other embodiments, however, the trace next fetch predictor 420 may store a pre-computed completed updated history value.

For a given path history update, hash circuitry may be configured to perform an exclusive-or operation between set of bits of the fetch address of the current fetch group and all or a portion of the bits of the previous path history. As one specific example, the path history may be an M+N bit value that is shifted left by one and XOR'd with N bits of the fetch address of the current fetch group to generate the next path history value each cycle, according to the following example equation:

$$\text{path\_hist}[M + N - 1:0] = \{\text{path\_hist}[M + N - 2:0],$$
$$1'b0\} \wedge \{M'b0, \text{N\_bits\_of\_PC}\}$$

For a given global history update, hash circuitry may be configured to perform an exclusive-or operation between all or a portion of a branch target and all or a portion of the bits of the previous global history. As one specific example, the global history may be an X+Y bit value that is shifted left by one and XOR'd with Y bits of the fetch address of the current fetch group to generate the next path history value each cycle, according to the following example equation:

$$\text{global\_hist}[X + Y - 1:0] = \{\text{global\_hist}[X + Y - 2:0],$$
$$1'b0\} \wedge \{X'b0, \text{Y\_bits\_of\_target}\}$$

Note that the Y bits of the target may or may not be contiguous and may be located at different positions within the address in different embodiments. The number of bits implemented for M, N, X, Y, etc. may affect the length of history used, control circuit area, the impact of a given address on the current history value, etc. These parameters may vary in different embodiments. In other embodiments, various other branch history encodings may be implemented.

Branch Predictor Lane for Trace-Related Predictions

Generally, various branches associated with traces may be used to train branch predictors, may be predicted by branch predictors (e.g., when ending a trace or when fetched from the instruction cache instead of the trace cache), etc. Building a dedicated branch predictor for the trace cache, however, may be undesirable in terms of area and power consumption. Therefore, in some embodiments branch predictor circuitry is shared for trace-related predictions and other predictions, with some additional circuitry dedicated for trace-related predictions. For example, predictor tables, program counter and history data paths, and hash functions may be shared.

In some embodiments, branch predictor circuitry is configured to provide only predictions for trace-ending branches among branches in a trace (although predictions may also be provided for less-stable-before-end branches as discussed in detail below with reference to FIG. 9). In some embodiments, updates for stable branches that are internal to the trace are ignored for branch prediction training purposes.

FIG. 7 is a block diagram illustrating an example trace prediction lane for a branch predictor with shared resources, according to some embodiments. In the illustrated embodiment, the processor includes trace cache 110, instruction cache 120, and branch predictor 710. Trace cache 110 and instruction cache 120 may be configured as described above and may output traces and fetch groups in response to hits for the fetch address.

Branch predictor 710, in the illustrated embodiment, is configured to provide predictions for one or more control transfer instructions in a given fetch group and is also configured to provide a prediction for the last control transfer instruction in a trace. In the illustrated embodiment, branch predictor 710 includes one or more shared prediction tables 726.

As shown, branch predictor 710 also includes dedicated logic for a trace cache lane 724 in addition to logic for branch prediction lanes for the instructions in a fetch group 722. Note that a given fetch group may include up to N instructions that could include conditional control transfer instructions at any locations within the group. Therefore, in the illustrated example, branch predictor 710 implements N lanes to provide separate predictions for the different fetch group positions. Certain lanes may not be toggled in a given cycle when that lane does not have a condition branch. More detailed examples of lane logic in the tagged geometric length predictor (TAGE) context are discussed in detail below with reference to FIG. 8. Note that once a predicted-taken branch is found, control circuitry may kill the remaining instructions in the fetch group such that they are further processed by the predictor.

Disclosed embodiments may advantageously provide accurate predictions for trace-ending branches with reasonably small increases in chip area and power consumption by sharing some circuitry with other types of predictions. In particular, internal stable branches may not need help from the branch predictor, so adding a small amount of dedicated circuitry for trace-ending branches may be sufficient.

In some embodiments, branch predictor 710 is configured to use the fetch group PC and history value corresponding to the beginning of the trace to access shared branch prediction tables to predict the direction of a trace-ending control transfer instruction (even though the trace-ending control transfer instruction is in a fetch group with a different fetch address that the trace-beginning fetch group). While this may not incorporate updates to the history value based on control transfer instructions that are internal to the trace, it may provide sufficient prediction accuracy, in these embodiments, without requiring hashing to completely bring the history value up to date. In particular, this may provide good accuracy because of the stability of the internal branches and may not require trace-specific changes to a branch predictor design.

FIG. 8 is a block diagram illustrating an example trace prediction lane for a tagged geometric length (TAGE) predictor, according to some embodiments. In the illustrated example, the TAGE predictor includes a base table T0 810 and M non-base tables 820 (only one of which is shown to facilitate explanation). As is well-understood by those of skill in the art, TAGE tables are indexed using independent functions of the global branch/path history and branch address (where the selected branch history lengths form a geometric series). Note that various numbers of TAGE levels may be implemented in various embodiments. In some embodiments, the TAGE tables are direct-mapped. In other embodiments, the tables are set associative.

As shown, the base table is accessed based on all or a portion of the PC of a given branch. In some embodiments, a given base table entry may also include a tag (not shown). A given entry in the TAGE base table T0 includes predictions for instructions in an instruction cache fetch group (e.g., an entry for an eight-instruction fetch group would include up to eight predictions). In the illustrated embodiments, a given T0 entry includes an extra prediction field for the trace cache. The T0 table provides one or more branch predictions to multiplexer (MUX) 840 and one trace cache prediction to MUX 845. The MUXes 840 and 845 also receive outputs from entries in table T1 (not shown) and are controlled based on whether there is a hit in T1. Generally, the highest-level table with a hit may be used to provide a prediction by that lane while the T0 table may be used if all of the other tables miss.

Generally, the higher-level tables are indexed based on increasingly-greater portions of the global history, in conjunction with the PC (hashed, in this example). The tag may also be based on the PC, a portion of the global history, a hash thereof, etc.

In the illustrated example, table M 820 provides up to N+1 predictions for the lanes in a fetch group plus the trace cache, in the illustrated embodiment, to MUXes 850 and 855. These MUXes also receive the outputs of the MUX for the previous-level TAGE table. Up to N traditional predictions 860 are output from MUX 850 and MUX 855 outputs a trace cache prediction 865 if there was a hit in any table. In some embodiments, for traditional predictions 860, control circuitry may indicate the first predicted taken branch and kill subsequent predictions.

As shown, table M is indexed based on a hash of the program counter and history generated by hash logic 825 (it may also be tagged based on similar information using different portions of the PC/history). In the illustrated example, each entry has corresponding tag, prediction, position, and use values. The tag value is used to determine hits and misses at a given index. The prediction value indicates a prediction (e.g., taken or not taken) for a valid entry that is hit. The prediction value is maintained using a saturating counter in some embodiments and may indicate a particular direction based on meeting a threshold. Entries may be considered to be training and may not provide predictions until they reach a threshold, for example.

The position field indicates the position within a fetch group for which the prediction is made. For example, for a fetch group with N instructions, the prediction may be for the first, second, or third instruction, and so on.

The use field, in some embodiments, indicates the usefulness of a given entry. As one example, this table may be increased by a certain value when an entry is used to provide a prediction and decreased in response to other events (e.g., on a premature trace exit, or over time as other tables provide predictions). Control circuitry may determine when to evict entries in a given table based on the use field.

Hit logic 830, in some embodiments, determines whether there is a hit based on the tag and position fields and passes the prediction field for the appropriate lane(s) to MUXes 850 and 855. It also controls MUXes 850 and 855 based on whether there is a hit (e.g., to pass the value from the current level based on a hit or to select a value from a previous level based on a miss).

In some embodiments, a given entry in a non-base TAGE table includes a "trace cache" field indicating whether the prediction is a trace cache prediction or an instruction cache prediction. Control circuitry may then provide predictions from entries marked as trace cache predictions to MUX 855. Control circuitry may also use this trace cache field to determine hits and misses (e.g., where the state of the trace cache field should match the type of fetch used for the fetch group for a hit). Control circuitry may ignore the position field for trace cache entries, in these embodiments.

In other embodiments, control circuitry is configured to imply whether an entry is for an instruction cache CTI or a trace CTI. For example, allocations based on trace cache traces may populate the position field with the position of the first instruction in the trace for training, which may be unique (e.g., in embodiments where an unstable branch can only occur after one or more stable branches in a trace, the fetch group PC of the first fetch group will be unique). In this case, because no other branch will use this position, only accesses associated with the trace will hit the entry. For LBE branches (discussed in detail below), there may be potential aliasing with branch predictor entries for the instruction cache. This may be avoided, in some embodiments, e.g., by restricting LBE branches such that they cannot be the first instruction of the first fetch group of a trace, inverting tag bits (e.g., XORing with a vector of binary 1's) for trace cache entries in the branch predictor, etc.

In the illustrated example, the extra prediction field for the trace cache in entries of table T0 and MUXes 845 and 855 are one example of the logic for the trace cache lane 724 of FIG. 7, while tables 1 through N of the TAGE predictor are shared for traditional instruction cache predictions and trace cache predictions.

While TAGE predictors are discussed herein for purposes of explanation, disclosed techniques with some dedicated trace prediction circuitry and other shared circuitry may be implemented in various other types of branch predictors; the example of FIG. 8 is not intended to limit the scope of the present disclosure. Similarly, while sharing predictor resources for trace cache predictions are discussed with reference to various embodiments, a separate predictor for trace cache predictions may be implemented in other embodiments.

Less-Stable Before End (LBE) Techniques

As briefly mentioned above, branch predictor circuitry may provide predictions for branches of multiple different categories of stability. For example, the stable portions of the spectrum of FIG. 2A may be one category and the LBE candidate portions another category (both of which are distinct from an unstable category that does not meet either threshold). Predictions associated with the different categories of stability may be provided by different predictors (e.g., stable branch predictor 432 and a separate LBE predictor) or the same predictor (e.g., stable branch predictor 432).

In some embodiments, one or more less-stable categories are allowed to be included as non-terminating instructions of a trace in certain scenarios. Generally, disclosed techniques that allow LBE branches within traces may permit formation of more traces than embodiments or modes that are more strict (e.g., that only allow 100% biased internal branches), which may improve trace cache coverage while limiting performance penalties associated with unstable branches.

Therefore, in some embodiments, trace formation control circuitry (e.g., circuitry 150, 455, or both) may include certain less stable branches within a trace. FIG. 9 is a diagram illustrating this concept. As shown, a trace includes N fetch groups and one or more less-stable control transfer instructions are allowed mid-trace. In some embodiments, a threshold number of less-stable branches are allowed mid-trace (e.g., a single LBE branch, two LBE branches, etc.). In some embodiments, such less-stable branches are restricted to one or more specific positions (e.g., fetch group positions) within a trace.

When a branch unexpectedly exits a cache trace, the processor may chop the retrieved fetch group (to throw away instructions after the branch) and redirect the front-end to the correct path. Note that unexpected trace exits may occur due to actual execution of a branch instruction that executes in a direction for which subsequent instructions are not cached in the trace (e.g., the branch is not taken when the trace stores instructions assuming the branch was taken). Unexpected trace exits may also occur based on a branch prediction, before the branch is actually executed. For example, the processor may chop a fetch group from a trace based on a branch predictor prediction that a branch is not taken, when the trace stores subsequent instructions from the taken path.

In some embodiments, trace cache 110 is configured to store traces with only one predicted direction for a given branch (e.g., the taken direction) and does not store traces in which the branch is predicted to execute in the other direction.

Control or prediction circuitry may track the stability of less-stable branches using different techniques in different embodiments. As one example, control circuitry may count the number of executions of a given branch in the non-biased direction (e.g., not taken for a branch that is biased taken). As another example, control circuitry may track the overall ratio or percentage of taken/not taken for previous executions of a given branch. This may utilize substantial storage, however, on a per-branch basis.

Therefore, in some embodiments, control circuitry is configured to assume that branches that do not meet a higher stability threshold still meet a less-stable stability threshold (potentially without knowledge of their stability), but filter to prevent such branches from being cached in traces if they do not satisfy this assumption.

Figure 10A:
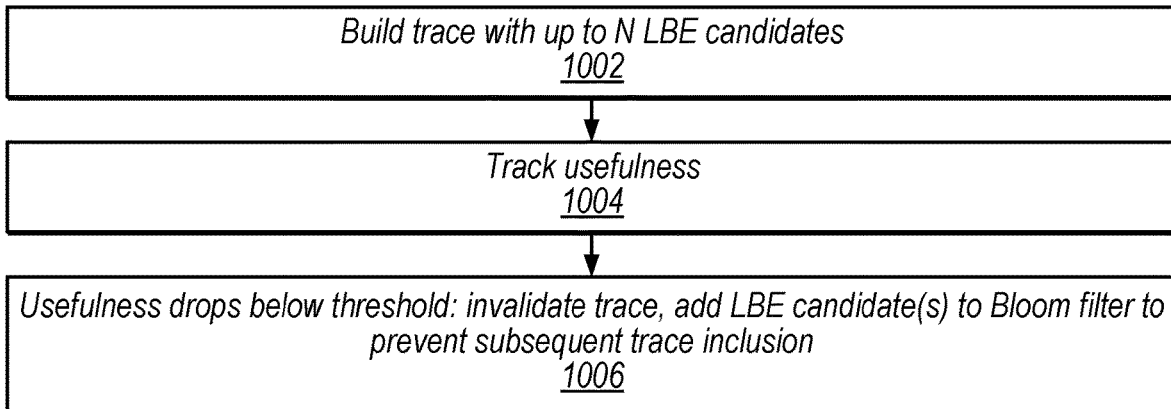
FIG. 10A is a diagram illustrating an example filter-based less-stable before end (LBE) trace cache technique, according to some embodiments.

FIG. 10A is a flow diagram illustrating example filter-based LBE techniques, according to some embodiments. At 1002 in the illustrated embodiment, control circuitry builds a trace with up to N LBE candidates. This may include storing instructions for the trace in a training buffer or in trace cache 110. In some embodiments, N=1 and at most a single LBE branch is allowed within a trace. In some embodiments the position(s) of LBE branches are restricted within a trace, e.g., to being in the first fetch group within the trace or some other position. Note that branches that meet a higher stability threshold may be included without such restrictions, in some embodiments.

At 1004 in the illustrated embodiment, control circuitry tracks the usefulness of the trace. This may include incrementing a counter in response to a branch executing toward the next portion of the stored trace and decrementing the counter in response to the branch executing away from the next portion of the trace (exiting the trace). The decrement amount may be greater than the increment amount (e.g., twice the increment amount, three times the increment amount, etc.).

Note that the usefulness field may also be adjusted based on other factors, e.g., decremented over time. In various implementations, the usefulness field will eventually reflect the amount of bias of one or more LBE branches within a trace. In some embodiments, separate fields may be used to reflect replacement policy information and LBE usefulness.

At 1006 in the illustrated embodiment, the usefulness value drops below a threshold. In response, the control circuitry invalidates the trace. The control circuitry also adds one or more LBE candidate branches to a Bloom filter to prevent their inclusion in subsequent traces. In these embodiments, the filtering enforces the LBE minimum stability threshold. Note that an upper usefulness threshold for successful training of a trace and a lower threshold for invalidating a trace may be different distances away from an initial value of the usefulness field. Thus, in various LBE embodiments, traces may be invalidated based on unexpected LBE directions more rapidly than they are considered trained, e.g., to avoid performance impacts of branches that do not meet the LBE bias threshold.

The Bloom filter may be accessed using the PC of the branch or the PC of a fetch group that includes the branch, for example. Therefore, control circuitry may check the Bloom filter before including a given branch as an internal branch within a trace to prevent using branches from the Bloom filter internally within a trace. While a Bloom filter is discussed for purposes of illustration, other types of filters may be implemented in other embodiments.

Figure 10B:
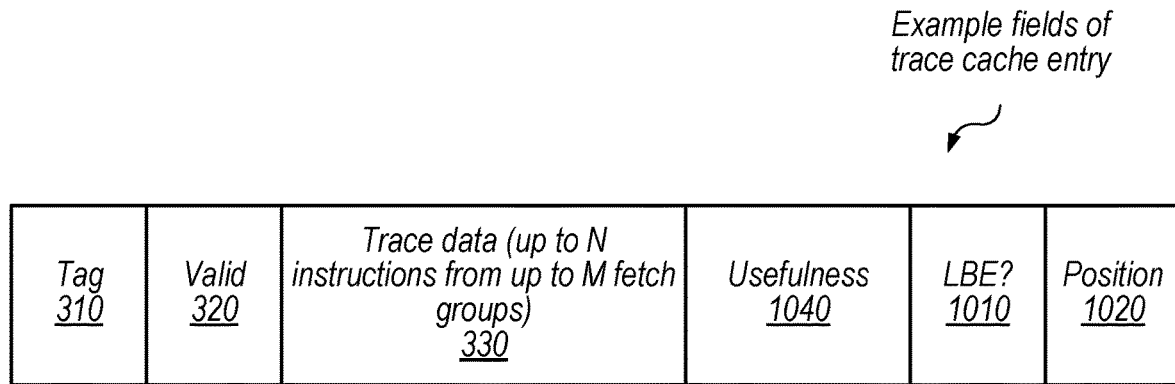
FIG. 10B is a diagram illustrating another example of trace cache entry fields, according to some embodiments.

FIG. 10B is a diagram illustrating example fields of a trace cache entry a trace cache that supports LBE, according to some embodiments. In the illustrated example, in addition to fields 310, 320, and 330 discussed above with reference to FIG. 3, a trace cache entry includes LBE field 1010, position field 1020, and usefulness field 1040. Note that these fields may be included in a training buffer, trace cache entry, or both.

LBE field 1010, in some embodiment, indicates whether the trace includes an LBE branch. Some traces may include only branches with the highest stability category and field 1010 may not be set for those traces.

Position field 1020, in some embodiments, indicates the position of an LBE branch within a trace (e.g., the Nth instruction position). Note that even if the position of LBE branches is restricted within a trace at a certain granularity (e.g., within the first fetch group) the instruction position of the LBE may still vary. Position field 1020 may provide this information. Position field 1020 may facilitate retrieval of branch predictions (e.g., from branch predictor 710) for LBE branches, may allow identification of instructions to be invalidated to chop a fetch group, or both, as discussed in detail below.

Usefulness field 1040, in some embodiments, indicates the usefulness of a given trace. This may be tracked during training, while validly cached in trace cache 110, or both. As discussed above, in some embodiments, the usefulness field is decremented by a greater amount when an LBE branch executes in the non-biased direction than when the trace is completely executed. This may allow invalidation of the trace and updating the Bloom filter for branches that turn out not to meet the LBE stability threshold. In some embodiments, the usefulness field 1040 is updated differently depending on whether the LBE field 1010 is set.

In some embodiments, a given trace is allowed to include multiple LBE branches. In these embodiments, the usefulness field may encode separate information for different LBE branches, e.g., to indicate a subset of LBE branches that contribute to a trace falling below a usefulness threshold. This may allow one or more LBE branches from a trace to be added to the Bloom filter while others remain valid for inclusion in other traces.

Figure 10C:
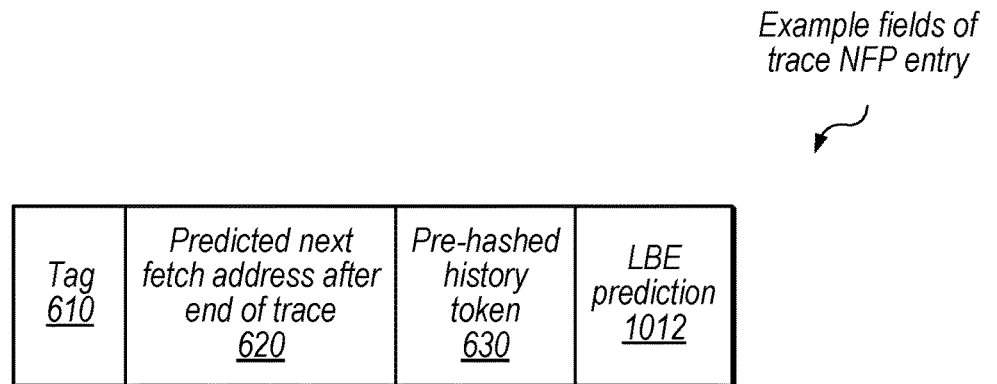
FIG. 10C is a diagram illustrating example fields of a next fetch predictor entry, according to some embodiments.

FIG. 10C is a diagram illustrating example fields of a trace NFP entry that supports LBE, according to some embodiments. In the illustrated example, a given NFP entry includes an LBE prediction field 1012 that indicates the predicted direction of an LBE branch. In some embodiments, control circuitry uses this field to improve performance when an LBE branch exits a trace.

For example, consider a situation where a trace that includes an LBE taken branch is successfully built and is useful. Occasionally, the LBE branch may not be taken multiple times in a row. However, the number of times may not be enough to decrement the usefulness value sufficiently to invalidate the trace. In this situation, in response to the first time the LBE branch is not taken, control circuitry chops the fetch groups and redirects the front end. It also trains the trace next fetch predictor 420 to set the predicted PC (field 620) to the PC of the LBE branch+the instruction size (to indicate the sequential instruction following the LBE branch) and sets the LBE prediction field 1012, in some embodiments. The next time the LBE branch is not taken, the trace NFP 420 provides the sequential next fetch PC. In some embodiments, control circuitry sees that the LBE prediction field 1012 is set and does not update the global history so that the next fetch group gets the correct history. In this manner, the processor can avoid the front-end redirect for one or more subsequent iterations of the LBE branch that are not taken. Control circuitry may clear the LBE prediction field 1012 in response to the LBE branch taking its expected direction and reset the predicted next fetch address 620 to the end of the trace.

Figure 11:
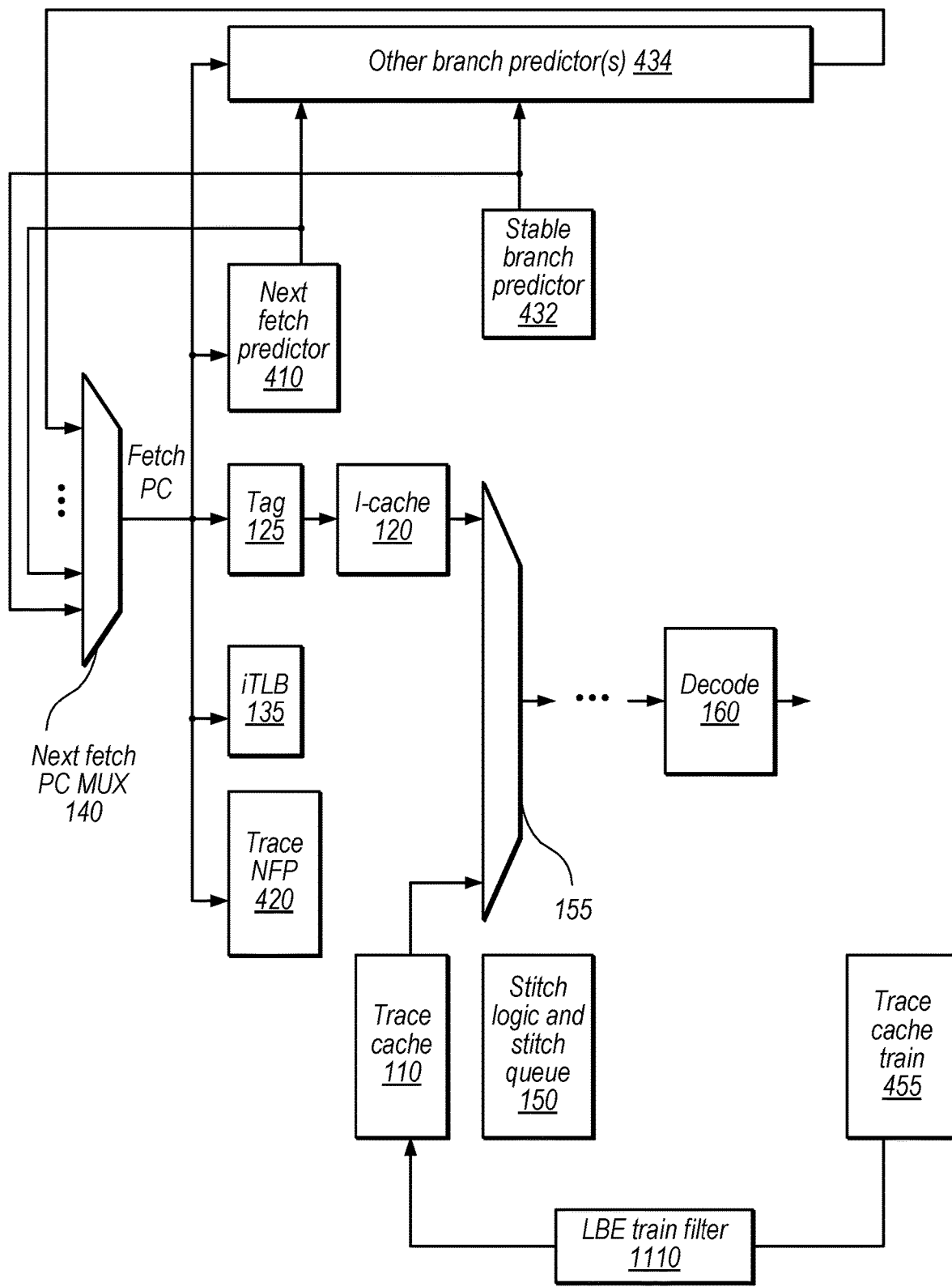
FIG. 11 is a block diagram illustrating an example pipeline that includes filter circuitry for training to prevent certain control transfer instructions from being included before the end of a trace, according to some embodiments.

FIG. 11 is a block diagram illustrating an example pipeline that includes filter circuitry configured to train to prevent certain control transfer instructions from being included before the end of a trace, according to some embodiments. Various elements with similar numbering may be configured as described above with reference to FIG. 1, FIG. 4, or both, and these elements are not discussed in detail with reference to FIG. 11. In the illustrated embodiment, the processor includes LBE train filter 1110 between trace cache train circuitry 455 and trace cache 110.

LBE train filter 1110, in some embodiments, is configured to set Bloom filter entries for LBE branches that cause traces to fall below a usefulness threshold. The Bloom filter may be accessed using the PC of the LBE branch, the PC of a fetch group that includes the LBE branch, etc. In embodiments with multiple LBEs allowed in a given trace, LBE train filter 1110 may determine which LBE(s) caused the usefulness issue and write the Bloom filter accordingly. In some embodiments, LBE train filter 1110 is configured to clear the Bloom filter periodically, e.g., every N million cycles. Periodic clearing may allow certain branches to be included in traces again, e.g., if an anomalous event caused them to fall below a bias threshold but they typically meet the bias threshold during execution.

Consider an example with a 50% biased branch. The control circuitry may initially assume that the branch meets an LBE bias threshold. Based on the assumption, traces with one or both directions of the branch may be in training or cached in the trace cache. Because the assumption was incorrect in this example, however, one or both traces will fall below the usefulness threshold and the branch will be added to the Bloom filter.

Note that when an LBE branch unexpectedly exits the trace, the processor may need to recover the global history. In embodiments in which LBE branches are only allowed in the first fetch group of a trace, the processor may simply reset the history to the value corresponding to the beginning of the trace. In other embodiments, the processor may include more complicated logic to store prior history values corresponding to different LBE positions or to perform a reverse computation to re-generate the history prior to a mispredicted LBE branch.

Example Branch Prediction for LBE Branches

Figure 12:
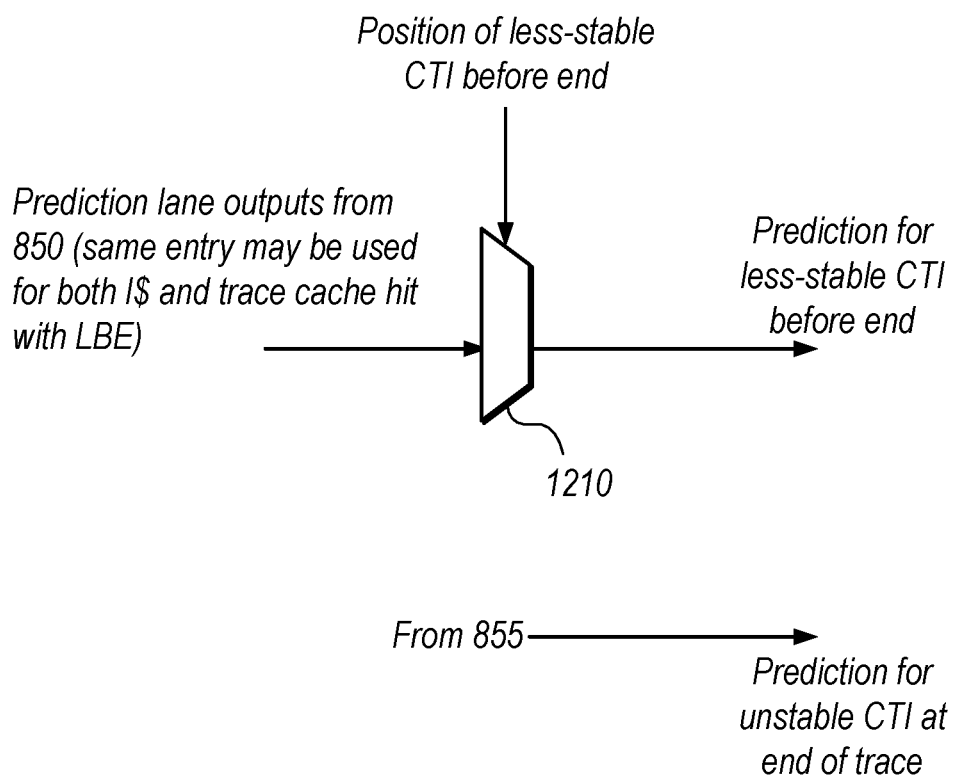
FIG. 12 is a diagram illustrating example control circuitry that enables sharing a branch predictor table entry for both instruction cache and trace cache hits, according to some embodiments.

FIG. 12 is a diagram illustrating example control circuitry that enables sharing a branch predictor table entry for both instruction cache and trace cache hits, according to some embodiments. In this example, LBE branches are handled differently than trace-ending branches in terms of branch prediction. In particular, as discussed in detail above with reference to FIG. 7, a branch predictor may include an extra lane for a trace-ending branch that is not stable. In contrast, LBE branches may share the same branch predictor entry and prediction lane for both instruction cache hits and trace cache hits, as discussed in detail below. Note that sharing of branch predictor entries for instruction cache hits and LBE entries may be restricted to LBEs in certain positions (e.g., LBE in the first fetch group of a given trace) while other LBE branches may allocate their own branch predictor entries.

In the illustrated example, MUX 1210 receives the prediction lane outputs from MUX 850 of FIG. 8 which may include N prediction lanes for fetch groups of N instructions. Note that the same entry in one of the TAGE prediction tables may be used for instruction cache and trace cache hits (where the hit trace includes an LBE branch) in this example. For a trace cache hit, in this example, control circuitry controls MUX 1210 (e.g., based on position field 1020) to select the proper prediction for the LBE branch.

As shown, the branch predictor may also provide a prediction for an unstable trace-ending CTI from MUX 855 in parallel with the LBE branch prediction. Generally, disclosed techniques may facilitate LBE branch prediction by sharing existing circuitry, which may limit area and power consumption due to LBE branches and prevent capacity pressure on the predictor tables, with only minor reductions in coverage. As discussed above, if the prediction for an LBE branch indicates an unexpected exit of the trace, control circuitry may chop the trace and redirect the front-end.

Note that various disclosed branch predictor techniques such as a dedicated trace cache lane, predictions for a trace-ending branch based on the fetch program counter of the first fetch group of a trace, etc. may be included in multiple separate branch predictors, e.g., separate predictors for direct branches and indirect branches, in some embodiments.

Example Method

Figure 13:
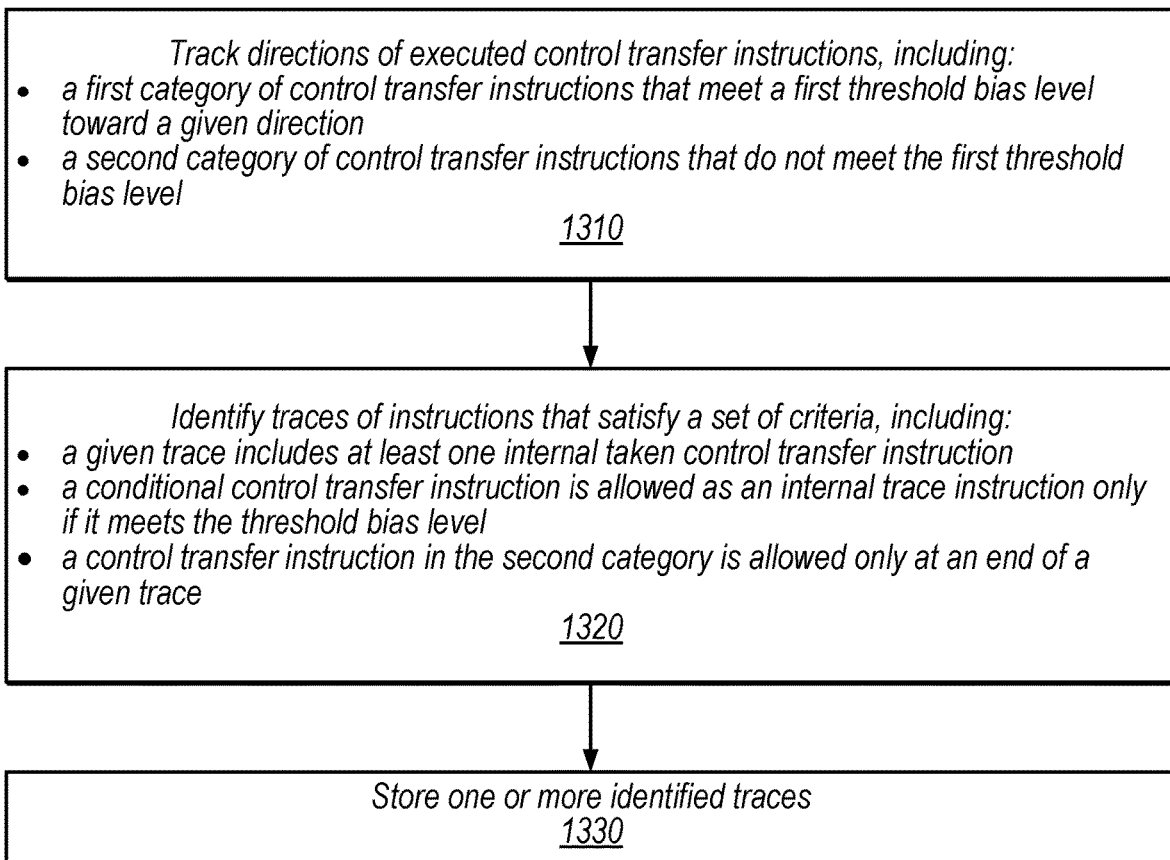
FIG. 13 is a flow diagram illustrating an example method for operating a trace cache, according to some embodiments.

FIG. 13 is a flow diagram illustrating an example method for caching traces, according to some embodiments. The method shown in FIG. 13 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 1310, in the illustrated embodiment, a processor (e.g., one or more branch predictors) tracks directions of executed control transfer instructions, including: a first category of control transfer instructions that meet a first threshold bias level toward a given direction (e.g., stable branches, LBE branches, or both) and a second category of control transfer instructions that do not meet the first threshold bias level (e.g., unstable branches).

In some embodiments, the first category includes only control transfer instructions that have always taken the given direction during execution over a time period (100% biased over that period). In some embodiments, the first category includes control transfer instructions that have taken the given direction at least a threshold ratio over a time period. In some embodiments, the prediction circuitry includes a biased predictor configured to generate the first category of predictions based on a bias table.

The first category may include multiple sub-categories of bias ranges that are handled differently, e.g., in LBE embodiments. For example, the filter control circuitry may be configured to handle a third category of control transfer instructions that correspond to a subset of the first category of control transfer instructions (e.g., LBE branches) that do not meet a second threshold bias level (e.g., the "stable" level of FIG. 2A). This handling may include to, for a given internal control transfer instruction of the third category of in stored trace, adjust a counter in a first direction (e.g., increase) in response to the given control transfer instruction executing toward the next portion of the stored trace and adjust the counter in a second direction (e.g., decrease) in response to the given control transfer instruction executing away from the next portion of the stored trace. The filter control circuitry may prevent inclusion of the given control transfer instruction as an internal instruction of traces in the trace cache in response to the counter reaching a threshold in the second direction (e.g., corresponding to the LBE lower threshold).

At 1320, in the illustrated embodiment, the processor (e.g., trace cache control circuitry) identifies traces of instructions that satisfy a set of criteria, including: a given trace includes at least one internal taken control transfer instruction, a conditional control transfer instruction is allowed as an internal trace instruction only if it meets the threshold bias level (e.g., only the first category of control transfer instructions may be allowed internally in a trace), and a control transfer instruction in the second category is allowed only at an end of a given trace. A given trace may also include up to a threshold number of taken control transfer instructions.

In some embodiments, stitch queue circuitry is configured to generate traces for caching in the trace cache circuitry from multiple fetch groups retrieved from an instruction cache. In some embodiments, training circuitry for the trace cache circuitry is configured to: buffer traces until they meet a usefulness threshold and validate entries in the trace cache circuitry for traces that meet the one or more criteria and the usefulness threshold (note that the validation may include allocating a new entry in the trace cache or validating a previous entry that was in training, for example). In some embodiments, the training circuitry is further configured to: implement rolling window buffering in which multiple partially-overlapping traces are buffered and select one of the partially-overlapping traces for allocation in the trace cache circuitry based on usefulness values of the partially-overlapping traces. In some embodiments, the training circuitry is configured to buffer fetch groups retrieved from an instruction cache and is configured not to buffer fetch groups retrieved from the trace cache circuitry (said another way, traces are sourced from the instruction cache, but not other traces, in these embodiments). In some embodiments, the training circuitry is configured to identify traces of instructions that satisfy the set of criteria cache after a decode stage of the processor circuitry.

At 1320, in the illustrated embodiment, the processor (e.g., a trace cache) stores one or more identified traces. The processor may retrieve and execute traces in response to subsequent hits (e.g., instead of fetching from an instruction cache).

In some embodiments, trace cache control circuitry is configured to: evict a trace from the trace cache circuitry and replace a trace in the trace cache circuitry with another trace according to a replacement policy. Generally, control circuitry may perform various appropriate cache maintenance operations for the trace cache.

Figure 14:
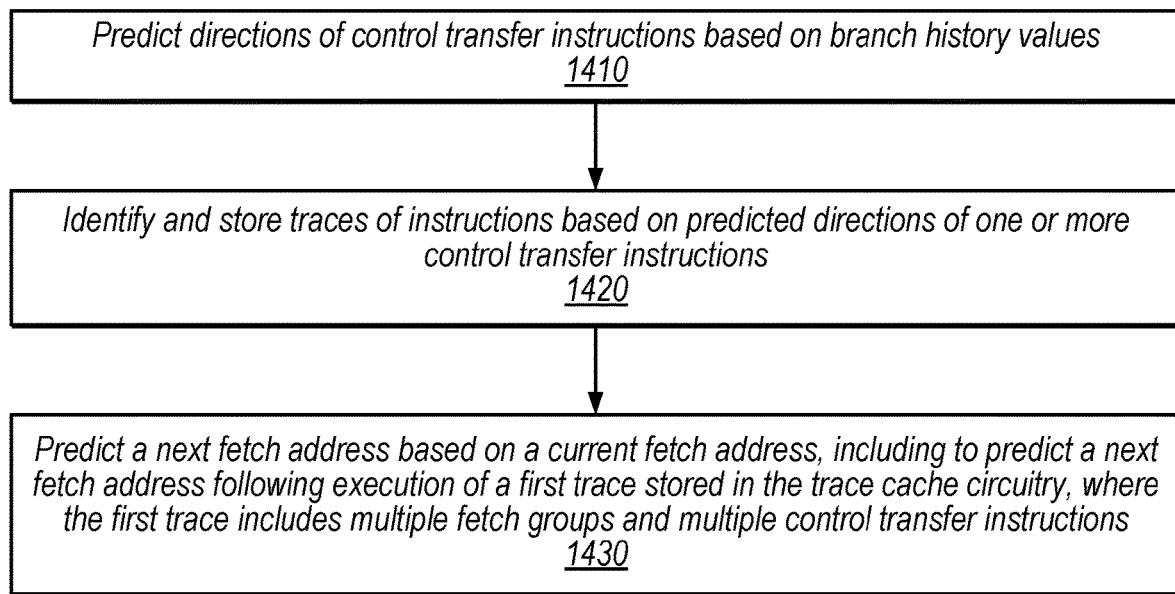
FIG. 14 is a flow diagram illustrating an example method that utilizes a less-stable branch before the end (LBE) of a trace, according to some embodiments.

FIG. 14 is a flow diagram illustrating an example method for operating a next fetch predictor for trace cache hits, according to some embodiments. The method shown in FIG. 14 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 1410, in the illustrated embodiment, a processor (e.g., one or more branch predictors) predicts directions of control transfer instructions based on branch history values.

At 1420, in the illustrated embodiment, the processor (e.g., a trace cache) identifies and stores traces of instructions based on predicted directions of one or more control transfer instructions.

At 1430, in the illustrated embodiment, the processor (e.g., a trace next fetch predictor) predicts a next fetch address based on a current fetch address, including predicting a next fetch address following execution of a first trace stored in the trace cache circuitry. In this example, the first trace includes multiple fetch groups and multiple taken control transfer instructions. In some embodiments, the trace includes multiple fetch groups.

In some embodiments, control circuitry is configured to pre-compute branch history update information based on multiple taken control transfer instructions in the first trace, store the branch history update information in the trace next fetch predictor circuitry, and retrieve the branch history update information in response to a hit in the trace next fetch predictor circuitry. The control circuitry may hash the retrieved branch history update information with a current branch history value to generate an updated branch history value. The pre-computation may include performing one or more hash operations on address information associated with a given taken branch and one or more left-shift operations. The stored branch history update information may be encoded using a smaller number of bits than the current branch history value.

In some embodiments, the trace cache circuitry and the trace next fetch predictor circuitry are indexed and tagged using at least a portion of the same sets of bits of the current fetch address. In some embodiments, the processor includes non-trace next fetch predictor circuitry configured to predict the next fetch address based on the current fetch address. Control circuitry may select a prediction by the trace next fetch predictor circuitry in response to hits in both the trace next fetch predictor circuitry and the non-trace next fetch predictor circuitry. In other embodiments, control circuitry may implement various arbitration schemes in which the trace next fetch predictor is provided with greater weight, higher priority, etc., relative to other next fetch predictor(s). In some embodiments, the trace next fetch predictor is a single-cycle predictor configured to predict a next fetch address for an immediately-subsequent cycle to the cycle in which a fetch is performed using the current fetch address.

Figure 15:
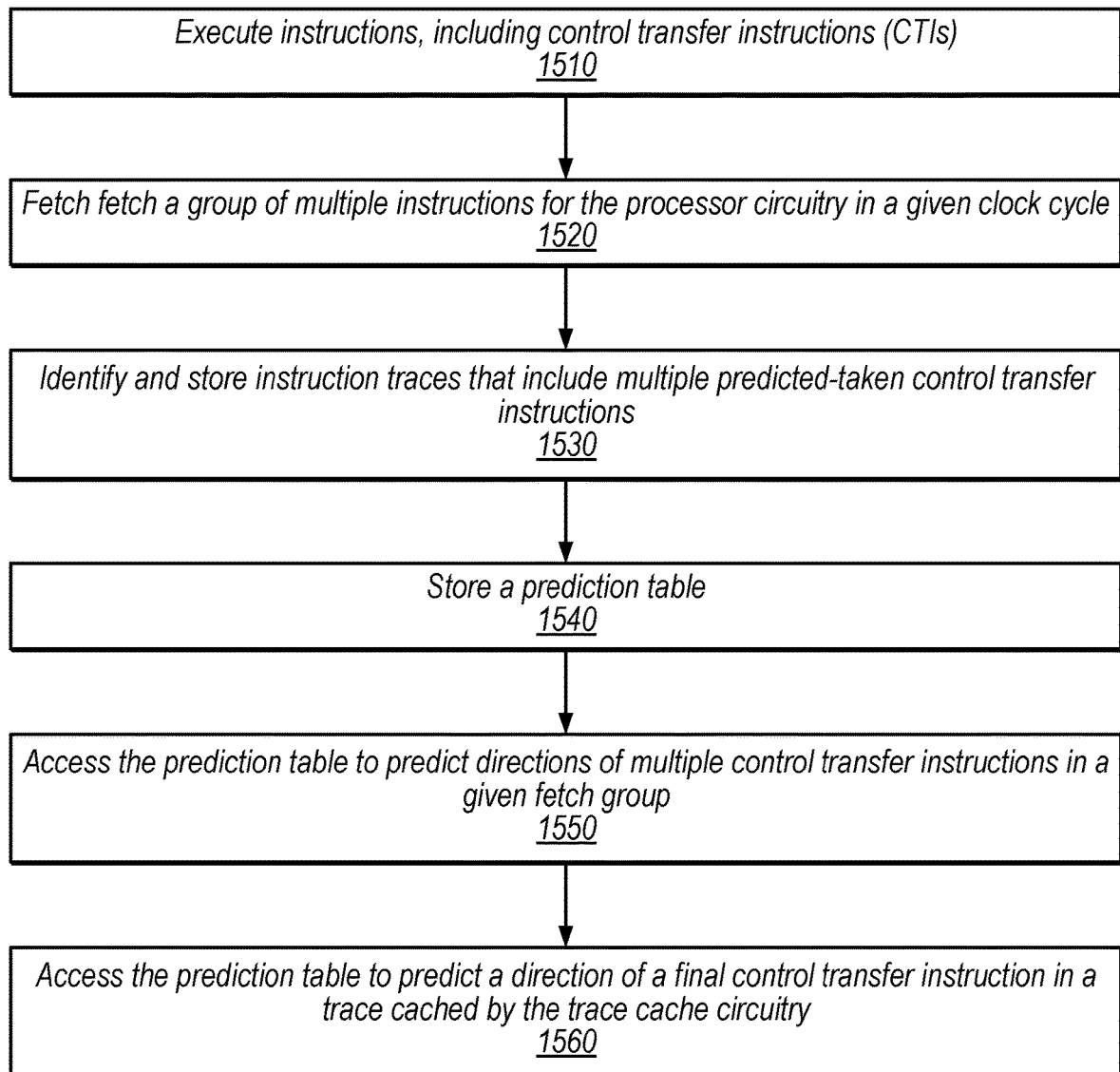
FIG. 15 is a flow diagram illustrating an example method for operating a trace next fetch predictor, according to some embodiments.

FIG. 15 is a flow diagram illustrating an example method for utilizing a trace predictor lane with a shared predictor table, according to some embodiments. The method shown in FIG. 15 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 1510, in the illustrated embodiment, a processor executes instructions, including control transfer instructions (CTIs).

At 1520, in the illustrated embodiment, the processor (e.g., a fetch stage) fetches fetch a group of multiple instructions for the processor circuitry in a given clock cycle.

At 1530, in the illustrated embodiment, the processor identifies and stores instruction traces that include multiple predicted-taken control transfer instructions.

At 1540, in the illustrated embodiment, the processor (e.g., a branch predictor) stores a prediction table. The table may be shared for predictors for instruction cache hits and for trace cache hits, as discussed in detail below. The processor may include multiple predictors and a given predictor may implement multiple tables.

In some embodiments, the table circuitry includes a field for one or more entries that indicates whether those entries are for trace cache predictions or for non-trace predictions. In other embodiments, the prediction circuitry may imply whether an entry is used for a trace cache prediction. For example, the prediction circuitry may use a fixed position value for predictions for the trace cache circuitry to avoid overlap with non-trace predictions. The fixed position value may correspond to the starting instruction of a cached trace.

The table circuitry may store multiple prediction tables, e.g., a base table and multiple levels of tagged geometric length (TAGE) tables. The trace predictor lane circuitry may be configured to use a dedicated prediction field in one or more entries of the base table and share the TAGE tables with the CTI predictor lane circuitry. Selection circuitry may generate a trace cache prediction based on hit results from multiple TAGE tables (and may prioritize the highest-level table).

At 1550, in the illustrated embodiment, the processor accesses the prediction table to predict directions of multiple control transfer instructions in a given fetch group.

At 1560, in the illustrated embodiment, the processor accesses the prediction table to predict a direction of a final control transfer instruction in a trace cached by the trace cache circuitry. In some embodiments, the trace predictor lane circuitry is configured to access the table circuitry using a fetch address associated with a starting fetch group in a given trace to predict an address for a control transfer instruction in a last fetch group in the given trace. This may reduce complexity while providing accurate results (e.g., due to the stability of any internal branches in the trace).

Note that the techniques of FIG. 15 for a trace-ending branch may be performed in parallel with predictions for LBE branches. For example, the prediction circuitry may, for a first control transfer instruction that is included in a trace as a non-terminating control transfer instruction, share a table entry and CTI predictor lane circuitry for both trace (e.g., LBE) and non-trace predictions for the first control transfer instruction. The prediction circuitry may, for a trace prediction for the first control transfer instruction, determine the shared CTI predictor lane circuitry based on a position of the first control transfer instruction in the trace.

Figure 16:
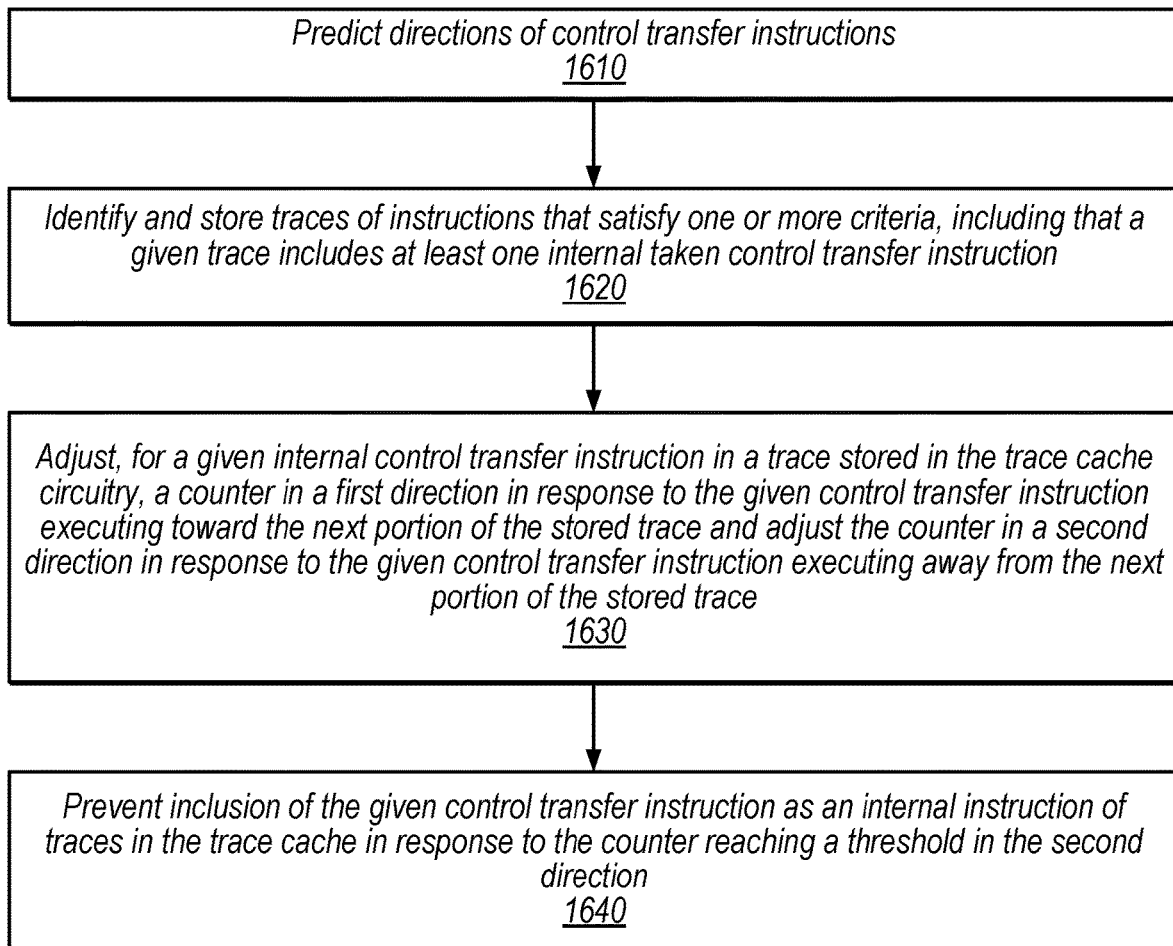
FIG. 16 is a flow diagram illustrating an example method for operating a processor with a trace cache branch predictor lane, according to some embodiments.

FIG. 16 is a flow diagram illustrating an example method for handling LBE branches, according to some embodiments. The method shown in FIG. 16 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 1610, in the illustrated embodiment, a processor (e.g., a branch predictor) predicts directions of control transfer instructions.

At 1620, in the illustrated embodiment, the processor (e.g., a trace cache) identifies and stores traces of instructions that satisfy one or more criteria, including that a given trace includes at least one internal taken control transfer instruction.

In some embodiments, the one or more criteria further include a criterion that only control transfer instructions of a first category (e.g., stable branches) are allowed at one or more positions within a given trace (where control transfer instruction of the first category meet a first threshold bias level toward a given direction and control transfer instructions of a second category do not meet the first threshold bias level). In some embodiments, control transfer instructions of the second category (e.g., LBE branches) are allowed only at one or more other positions within the given trace. Said another way, LBE branches may be allowed at only certain internal positions while stable branches may be allowed at other internal trace positions. Note that stable, LBE, or unstable branches may be allowed to end a trace.

In some embodiments, a given entry in the trace cache circuitry includes a field indicating whether the trace has a non-terminating control transfer instruction in the second category. In some embodiments, a given entry in the trace cache circuitry includes a field indicating a position within the trace of the non-terminating control transfer instruction in the second category.

At 1630, in the illustrated embodiment, the processor (e.g., trace cache control circuitry) adjusts, for a given internal control transfer instruction in a trace stored in the trace cache circuitry, a counter in a first direction (e.g., increases a usefulness value) in response to the given control transfer instruction executing toward the next portion of the stored trace and adjusts the counter in a second direction (e.g., decreases a usefulness value) in response to the given control transfer instruction executing away from the next portion of the stored trace.

In some embodiments, the processor adjusts the counter by a greater amount in the second direction than in the first direction.

At 1640, in the illustrated embodiment, the processor (e.g., filter control circuitry) prevents inclusion of the given control transfer instruction as an internal instruction of traces in the trace cache in response to the counter reaching a threshold in the second direction. In some embodiments, to prevent inclusion of the given control transfer instruction, filter control circuitry is configured to access a Bloom filter using a program counter associated with the given control transfer instruction. In some embodiments, the filter control circuitry is configured to clear the Bloom filter periodically.

In some embodiments, in response to a determined direction for a non-terminating control transfer instruction that exits a trace, the processor is configured to discard one or more subsequent instructions of a fetch group that included the non-terminating control transfer instruction and redirect front-end circuitry of the processor circuitry to fetch other instructions (this may be referred to as a chop and redirect). Note that the determined direction may be based on actual execution of the non-terminating control transfer instruction or based on a prediction by a branch predictor that the non-terminating control transfer instruction will exit the trace. In the latter case, in the rare case where the determined direction by the branch predictor is wrong, the processor may flush and replay based on the misprediction.

In some embodiments, the prediction circuitry is configured to share prediction table entries and prediction lane circuitry for instruction cache and trace cache hits. Selection circuitry may select a prediction lane output from the prediction circuitry based on a position of a corresponding control transfer instruction within a trace.

The following numbered clauses set out various non-limiting embodiments disclosed herein:

Set A

A1. An apparatus, comprising:
  processor circuitry configured to execute control transfer instructions;
  prediction circuitry configured to track directions of executed control transfer instructions, including:
    a first category of control transfer instructions that meet a first threshold bias level toward a given direction; and
    a second category of control transfer instructions that do not meet the first threshold bias level;
  trace cache circuitry configured to:
    identify traces of instructions that satisfy a set of criteria, including:
      a given trace includes at one internal taken control transfer instruction;
      a conditional control transfer instruction is allowed as an internal trace instruction only if it meets the threshold bias level; and
      a control transfer instruction in the second category is allowed only at an end of a given trace; and
    store one or more identified traces.

A2. The apparatus of any previous clause within set A, wherein the first category includes only control transfer instructions that have always taken the given direction during execution over a time period.

A3. The apparatus of any previous clause within set A, wherein the first category includes control transfer instructions that have taken the given direction at least a threshold ratio over a time period.

A4. The apparatus of any previous clause within set A, further comprising:
  filter control circuitry configured to handle a third category of control transfer instructions that correspond to a subset of the first category of control transfer instructions that do not meet a second threshold bias level, including to:
    for a given internal control transfer instruction of the third category of in stored trace, adjust a counter in a first direction in response to the given control transfer instruction executing toward the next portion of the stored trace and adjust the counter in a second direction in response to the given control transfer instruction executing away from the next portion of the stored trace; and prevent inclusion of the given control transfer instruction as an internal instruction of traces in the trace cache in response to the counter reaching a threshold in the second direction.

A5. The apparatus of any previous clause within set A, wherein the prediction circuitry includes a biased predictor configured to generate the first category of predictions based on a bias table.

A6. The apparatus of any previous clause within set A, further comprising:

stitch queue circuitry configured to generate traces for caching in the trace cache circuitry from multiple fetch groups retrieved from an instruction cache.

A7. The apparatus of any previous clause within set A, further comprising:

training circuitry for the trace cache circuitry, wherein the training circuitry is configured to:
buffer traces until they meet a usefulness threshold; and
validate entries in the trace cache circuitry for traces that meet the one or more criteria and the usefulness threshold.

A8. The apparatus of clause A7, wherein the training circuitry is further configured to:

implement rolling window buffering in which multiple partially-overlapping traces are buffered; and
select one of the partially-overlapping traces for allocation in the trace cache circuitry based on usefulness values of the partially-overlapping traces.

A9. The apparatus of clause A8, wherein the training circuitry is configured to buffer fetch groups retrieved from an instruction cache and is configured not to buffer fetch groups retrieved from the trace cache circuitry.

A10. The apparatus of any previous clause within set A, wherein the trace cache circuitry is configured to identify traces of instructions that satisfy the set of criteria cache after a decode stage of the processor circuitry.

A11. The apparatus of any previous clause within set A, further comprising:

trace cache control circuitry configured to:
evict a trace from the trace cache circuitry; and
replace a trace in the trace cache circuitry with another trace according to a replacement policy.

A12. The apparatus of any previous clause within set A, further comprising:

single-cycle next fetch predictor circuitry configured to predict a next fetch address following a trace, in response to a hit in the trace cache circuitry.

A13. The apparatus of any previous clause within set A, wherein the prediction circuitry includes:

shared table circuitry configured to store a prediction table;
CTI predictor lane circuitry configured to access the prediction table to predict directions of multiple control transfer instructions in a given fetch group; and
trace predictor lane circuitry configured to access the prediction table to predict a direction of a trace-ending control transfer instruction in a trace cached by the trace cache circuitry.

A14. The apparatus of any previous clause within set A, wherein the apparatus is a computing device that further includes:

a central processing unit;
a display; and
network interface circuitry.

A15. A method, comprising any combination of the operations performed by the apparatus of any previous clause within set A.

A16. A non-transitory computer-readable medium having instructions of a hardware description programming language stored thereon that, when processed by a computing system, program the computing system to generate a computer simulation model, wherein the model represents a hardware circuit that includes:

any combination of the elements recited in any previous clause within set A.

A17. A non-transitory computer readable storage medium having stored thereon program instructions that are executable to perform any combination of the operations performed by the apparatus of any previous clause within set A.

Set B

B1. An apparatus, comprising:

processor circuitry configured to execute control transfer instructions;
prediction circuitry configured to predict directions of control transfer instructions;
trace cache circuitry configured to identify and store traces of instructions that satisfy one or more criteria, including that a given trace includes at least one internal taken control transfer instruction; and
filter control circuitry configured to:
for a given internal control transfer instruction in a trace stored in the trace cache circuitry, adjust a counter in a first direction in response to the given control transfer instruction executing toward the next portion of the stored trace and adjust the counter in a second direction in response to the given control transfer instruction executing away from the next portion of the stored trace; and
prevent inclusion of the given control transfer instruction as an internal instruction of traces in the trace cache in response to the counter reaching a threshold in the second direction.

B2. The apparatus of clause B1, further comprising control circuitry configured to:

in response to a determined direction for a non-terminating control transfer instruction that exits a trace, discard one or more subsequent instructions of a fetch group that included the non-terminating control transfer instruction and redirect front-end circuitry of the processor circuitry to fetch other instructions.

B3. The apparatus of any previous clause within set B, wherein the one or more criteria further include:

that only control transfer instructions of a first category are allowed at one or more positions within a given trace, wherein control transfer instruction of the first category meet a first threshold bias level toward a given direction and control transfer instructions of a second category do not meet the first threshold bias level; and
that control transfer instructions of the second category are allowed only at one or more other positions within the given trace.

B4. The apparatus of clause B3, wherein a given entry in the trace cache circuitry includes a field indicating whether the trace has a non-terminating control transfer instruction in the second category.

B5. The apparatus of clause B4, wherein a given entry in the trace cache circuitry includes a field indicating a position within the trace of the non-terminating control transfer instruction in the second category.

B6. The apparatus of any previous clause within set B, wherein:

the filter control circuitry is configured to adjust the counter by a greater amount in the second direction than in the first direction.

B7. The apparatus of any previous clause within set B, further comprising:
an instruction cache;
wherein:
the prediction circuitry is configured to share prediction table entries and prediction lane circuitry for instruction cache and trace cache hits; and
the apparatus includes selection circuitry configured to select a prediction lane output from the prediction circuitry based on a position of a corresponding control transfer instruction within a trace.

B8. The apparatus of any previous clause within set B, wherein:
to prevent inclusion of the given control transfer instruction, the filter control circuitry is configured to access a Bloom filter using a program counter associated with the given control transfer instruction; and
the filter control circuitry is configured to clear the Bloom filter periodically.

B9. A method, comprising any combination of the operations performed by the apparatus of any previous clause within set B.

B10. A non-transitory computer-readable medium having instructions of a hardware description programming language stored thereon that, when processed by a computing system, program the computing system to generate a computer simulation model, wherein the model represents a hardware circuit that includes:
any combination of the elements recited in any previous clause within set B.

B11. A non-transitory computer readable storage medium having stored thereon program instructions that are executable to perform any combination of the operations performed by the apparatus of any previous clause within set B.

Set C

C1. An apparatus, comprising:
processor circuitry configured to execute control transfer instructions;
prediction circuitry configured to predict directions of control transfer instructions based on branch history values;
trace cache circuitry configured to identify and store traces of instructions based on predicted directions of one or more control transfer instructions; and
trace next fetch predictor circuitry configured to predict a next fetch address based on a current fetch address, including to predict a next fetch address following execution of a first trace stored in the trace cache circuitry, wherein the first trace includes multiple fetch groups and multiple taken control transfer instructions.

C2. The apparatus of clause C1, further comprising:
control circuitry configured to:
pre-compute branch history update information based on multiple taken branches in the first trace;
store the branch history update information in the trace next fetch predictor circuitry; and
retrieve the branch history update information in response to a hit in the trace next fetch predictor circuitry.

C3. The apparatus of clause C2, wherein the control circuitry is further configured to:
hash the retrieved branch history update information with a current branch history value to generate an updated branch history value.

C4. The apparatus of clause C3, wherein pre-computation includes to perform:
one or more hash operations on address information associated with a given taken branch; and
one or more left-shift operations.

C5. The apparatus of clause C3, wherein the stored branch history update information is encoded using a smaller number of bits than the current branch history value.

C6. The apparatus of any previous clause within set C, wherein the trace cache circuitry and the trace next fetch predictor circuitry are indexed and tagged using at least a portion of the same sets of bits of the current fetch address.

C7. The apparatus of any previous clause within set C, wherein:
the prediction circuitry is configured to track directions of executed control transfer instructions, including:
a first category of control transfer instructions that meet a first threshold bias level toward a given direction; and
a second category of control transfer instructions that do not meet the first threshold bias level;
the trace cache circuitry is configured to identify and store traces of instructions that satisfy a set of criteria, including:
a given trace includes at least one internal taken control transfer instruction;
a conditional control transfer instruction is allowed as an internal trace instruction only if it meets the threshold bias level; and
a control transfer instruction in the second category is allowed only at an end of a given trace.

C8. The apparatus of any previous clause within set C, further comprising:
non-trace next fetch predictor circuitry configured to predict the next fetch address based on the current fetch address; and
control circuitry configured to select a prediction by the trace next fetch predictor circuitry in response to hits in both the trace next fetch predictor circuitry and the non-trace next fetch predictor circuitry.

C9. The apparatus of any previous clause within set C, wherein the trace next fetch prediction circuitry is configured to predict a next fetch address for an immediately-subsequent cycle to the cycle in which a fetch is performed using the current fetch address.

C10. A method, comprising any combination of the operations performed by the apparatus of any previous clause within set C.

C11. A non-transitory computer-readable medium having instructions of a hardware description programming language stored thereon that, when processed by a computing system, program the computing system to generate a computer simulation model, wherein the model represents a hardware circuit that includes:
any combination of the elements recited in any previous clause within set C.

C12. A non-transitory computer readable storage medium having stored thereon program instructions that are executable to perform any combination of the operations performed by the apparatus of any previous clause within set C.

Set D

D1. An apparatus, comprising:
processor circuitry configured to execute instructions, including control transfer instructions (CTIs);
fetch circuitry configured to fetch a group of multiple instructions for the processor circuitry in a given clock cycle;

trace cache circuitry configured to identify and store instruction traces that include multiple predicted-taken control transfer instructions;

prediction circuitry that includes:

table circuitry configured to store a prediction table;

CTI predictor lane circuitry configured to access the prediction table to predict directions of multiple control transfer instructions in a given fetch group; and trace predictor lane circuitry configured to access the prediction table to predict a direction of a final control transfer instruction in a trace cached by the trace cache circuitry.

D2. The apparatus of clause D1, wherein the trace predictor lane circuitry is configured to access the table circuitry using a fetch address corresponding to a starting fetch group in a given trace to predict an address for a control transfer instruction in a last fetch group in the given trace.

D3. The apparatus of any previous clause within set D, wherein the table circuitry includes a field for one or more entries that indicates whether those entries are for trace cache predictions or for non-trace predictions.

D4. The apparatus of any previous clause within set D, wherein:

the table circuitry is configured to store multiple prediction tables, including:

a base table; and multiple levels of tagged geometric length (TAGE) tables; and the trace predictor lane circuitry is configured to use a dedicated prediction field in one or more entries of the base table and share the TAGE tables with the CTI predictor lane circuitry.

D5. The apparatus of clause D4, further comprising:

selection circuitry configured to generate a trace cache prediction based on hit results from multiple TAGE tables.

D6. The apparatus of clause D4, wherein the prediction circuitry is configured to use a fixed position value for predictions for the trace cache circuitry to avoid overlap with non-trace predictions.

7. The apparatus of clause D6, wherein the fixed position value corresponds to the starting instruction of a cached trace.

D8. The apparatus of any previous clause within set D, wherein the prediction circuitry is configured to track directions of executed control transfer instructions, including:

a first category of control transfer instructions that meet a first threshold bias level toward a given direction; and a second category of control transfer instructions that do not meet the first threshold bias level;

the trace cache circuitry is configured to store traces of instructions that satisfy one or more criteria, including:

a conditional control transfer instruction is allowed as an internal trace instruction only if it meets the threshold bias level; and a control transfer instruction in the second category is allowed only at an end of a given trace.

D9. The apparatus of any previous clause within set D, wherein:

the prediction circuitry is configured to, for a first control transfer instruction that is included in a trace as a non-terminating control transfer instruction, share a table entry and CTI predictor lane circuitry for both trace and non-trace predictions for the first control transfer instruction; and the prediction circuitry includes selection circuitry configured to, for a trace prediction for the first control transfer instruction, determine the shared CTI predictor lane circuitry based on a position of the first control transfer instruction in the trace.

D10. A method, comprising any combination of the operations performed by the apparatus of any previous clause within set D.

D11. A non-transitory computer-readable medium having instructions of a hardware description programming language stored thereon that, when processed by a computing system, program the computing system to generate a computer simulation model, wherein the model represents a hardware circuit that includes:

any combination of the elements recited in any previous clause within set D.

D12. A non-transitory computer readable storage medium having stored thereon program instructions that are executable to perform any combination of the operations performed by the apparatus of any previous clause within set D.

The concept of "execution" is broad and may refer to 1) processing of an instruction throughout an execution pipeline (e.g., through fetch, decode, execute, and retire stages) and 2) processing of an instruction at an execution unit or execution subsystem of such a pipeline (e.g., an integer execution unit or a load-store unit). The latter meaning may also be referred to as "performing" the instruction. Thus, "performing" an add instruction refers to adding two operands to produce a result, which may, in some embodiments, be accomplished by a circuit at an execute stage of a pipeline (e.g., an execution unit). Conversely, "executing" the add instruction may refer to the entirety of operations that occur throughout the pipeline as a result of the add instruction. Similarly, "performing" a "load" instruction may include retrieving a value (e.g., from a cache, memory, or stored result of another instruction) and storing the retrieved value into a register or other location.

As used herein the terms "complete" and "completion" in the context of an instruction refer to commitment of the instruction's result(s) to the architectural state of a processor or processing element. For example, completion of an add instruction includes writing the result of the add instruction to a destination register. Similarly, completion of a load instruction includes writing a value (e.g., a value retrieved from a cache or memory) to a destination register or a representation thereof.

The concept of a processor "pipeline" is well understood, and refers to the concept of splitting the "work" a processor performs on instructions into multiple stages. In some embodiments, instruction decode, dispatch, execution (i.e., performance), and retirement may be examples of different pipeline stages. Many different pipeline architectures are possible with varying orderings of elements/portions. Various pipeline stages perform such steps on an instruction during one or more processor clock cycles, then pass the instruction or operations associated with the instruction on to other stages for further processing.

For a given program or portion of a program, flow typically proceeds in a sequential fashion. Consider the following group of instructions: ld mem1→r1; add r1, r2→r3; st r3→mem2. In this exemplary sequence, execution and completion proceeds sequentially from the load instruction to the add instruction to the store instruction. This sequential ordering can be considered the program flow default. In this example, none of these instructions affects the selection of the next instruction to be executed and completed (beyond the default behavior).

In contrast, the execution and completion of instructions with certain opcodes potentially affects the selection of the next instruction to be executed and completed. These instructions are referred to herein as "control transfer instructions." Control transfer instructions may include, without limitation, branches, jumps, calls, returns, etc. Instructions of these types can cause a change in the default behavior of the next instruction to be executed and completed. Control transfer instructions may be used, for example, to execute a loop of instructions.

There may also be many different types of control transfer instructions. For example, control transfer instructions may operate conditionally (i.e., setting the program counter based on whether some condition is true or false) or unconditionally. Similarly, certain control transfer instructions may specify direct target addresses; other control transfer instructions may specify indirect target addresses. Note that the execution and completion of control transfer instructions may have effects on processor state other than on the location of the next instruction (e.g., there might be an instruction that branches after performing an arithmetic operation).

Example Device

Figure 17:
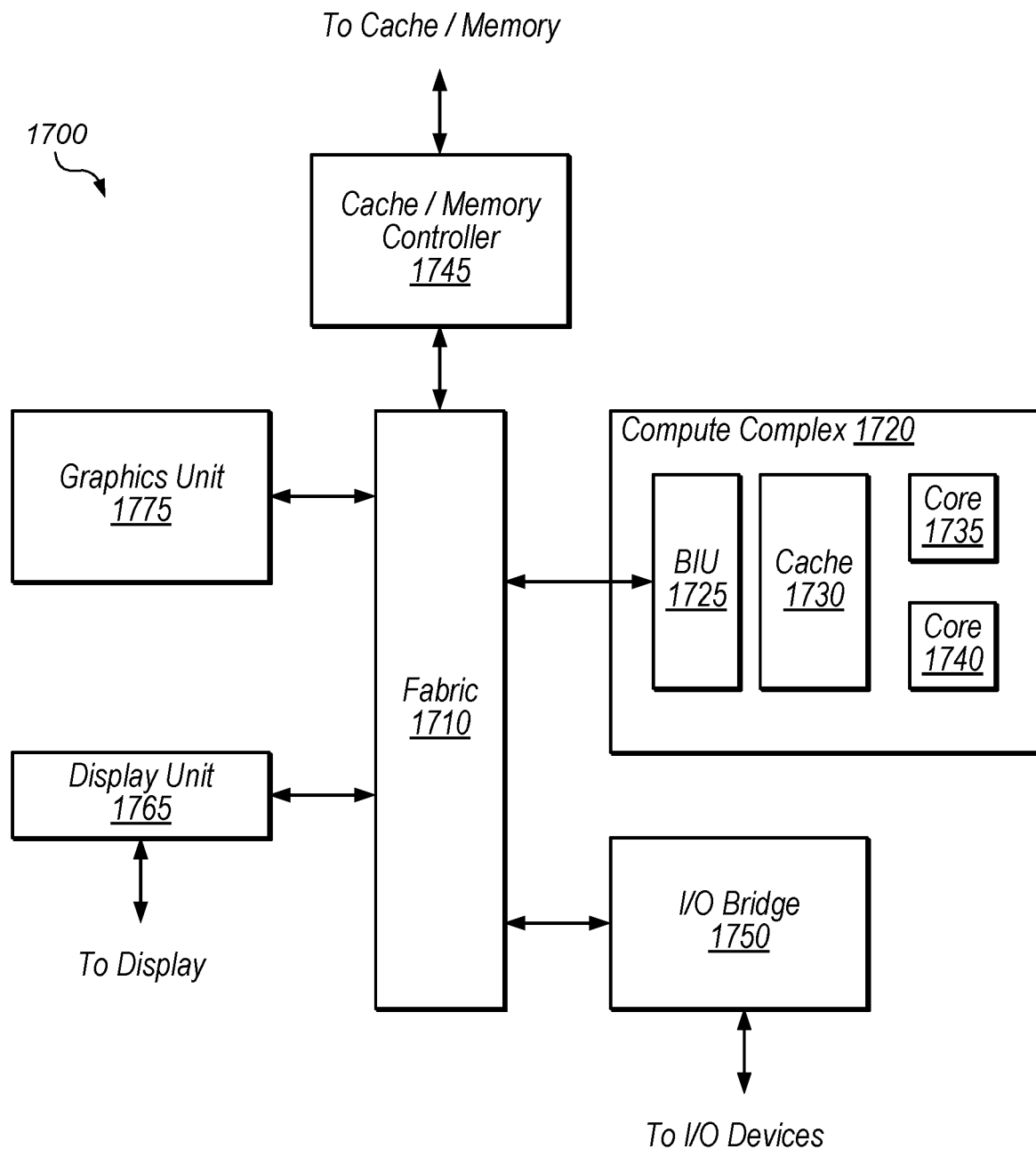
FIG. 17 is a block diagram illustrating an example computing device, according to some embodiments.

Referring now to FIG. 17, a block diagram illustrating an example embodiment of a device 1700 is shown. In some embodiments, elements of device 1700 may be included within a system on a chip. In some embodiments, device 1700 may be included in a mobile device, which may be battery-powered. Therefore, power consumption by device 1700 may be an important design consideration. In the illustrated embodiment, device 1700 includes fabric 1710, compute complex 1720 input/output (I/O) bridge 1750, cache/memory controller 1745, graphics unit 1775, and display unit 1765. In some embodiments, device 1700 may include other components (not shown) in addition to or in place of the illustrated components, such as video processor encoders and decoders, image processing or recognition elements, computer vision elements, etc.

Fabric 1710 may include various interconnects, buses, MUX's, controllers, etc., and may be configured to facilitate communication between various elements of device 1700. In some embodiments, portions of fabric 1710 may be configured to implement various different communication protocols. In other embodiments, fabric 1710 may implement a single communication protocol and elements coupled to fabric 1710 may convert from the single communication protocol to other communication protocols internally.

In the illustrated embodiment, compute complex 1720 includes bus interface unit (BIU) 1725, cache 1730, and cores 1735 and 1740. In various embodiments, compute complex 1720 may include various numbers of processors, processor cores and caches. For example, compute complex 1720 may include 1, 2, or 4 processor cores, or any other suitable number. In one embodiment, cache 1730 is a set associative L2 cache. In some embodiments, cores 1735 and 1740 may include internal instruction and data caches. In some embodiments, a coherency unit (not shown) in fabric 1710, cache 1730, or elsewhere in device 1700 may be configured to maintain coherency between various caches of device 1700. BIU 1725 may be configured to manage communication between compute complex 1720 and other elements of device 1700. Processor cores such as cores 1735 and 1740 may be configured to execute instructions of a particular instruction set architecture (ISA) which may include operating system instructions and user application instructions.

In some embodiments, disclosed trace cache techniques may improve the performance of one or more cores of compute complex 1720.

Cache/memory controller 1745 may be configured to manage transfer of data between fabric 1710 and one or more caches and memories. For example, cache/memory controller 1745 may be coupled to an L3 cache, which may in turn be coupled to a system memory. In other embodiments, cache/memory controller 1745 may be directly coupled to a memory. In some embodiments, cache/memory controller 1745 may include one or more internal caches.

As used herein, the term "coupled to" may indicate one or more connections between elements, and a coupling may include intervening elements. For example, in FIG. 17, graphics unit 1775 may be described as "coupled to" a memory through fabric 1710 and cache/memory controller 1745. In contrast, in the illustrated embodiment of FIG. 17, graphics unit 1775 is "directly coupled" to fabric 1710 because there are no intervening elements.

Graphics unit 1775 may include one or more processors, e.g., one or more graphics processing units (GPU's). Graphics unit 1775 may receive graphics-oriented instructions, such as OPENGL®, Metal, or DIRECT3D® instructions, for example. Graphics unit 1775 may execute specialized GPU instructions or perform other operations based on the received graphics-oriented instructions. Graphics unit 1775 may generally be configured to process large blocks of data in parallel and may build images in a frame buffer for output to a display, which may be included in the device or may be a separate device. Graphics unit 1775 may include transform, lighting, triangle, and rendering engines in one or more graphics processing pipelines. Graphics unit 1775 may output pixel information for display images. Graphics unit 1775, in various embodiments, may include programmable shader circuitry which may include highly parallel execution cores configured to execute graphics programs, which may include pixel tasks, vertex tasks, and compute tasks (which may or may not be graphics-related).

Display unit 1765 may be configured to read data from a frame buffer and provide a stream of pixel values for display. Display unit 1765 may be configured as a display pipeline in some embodiments. Additionally, display unit 1765 may be configured to blend multiple frames to produce an output frame. Further, display unit 1765 may include one or more interfaces (e.g., MIPI® or embedded display port (eDP)) for coupling to a user display (e.g., a touchscreen or an external display).

I/O bridge 1750 may include various elements configured to implement: universal serial bus (USB) communications, security, audio, and low-power always-on functionality, for example. I/O bridge 1750 may also include interfaces such as pulse-width modulation (PWM), general-purpose input/output (GPIO), serial peripheral interface (SPI), and inter-integrated circuit (I2C), for example. Various types of peripherals and devices may be coupled to device 1700 via I/O bridge 1750.

In some embodiments, device 1700 includes network interface circuitry (not explicitly shown), which may be connected to fabric 1710 or I/O bridge 1750. The network interface circuitry may be configured to communicate via various networks, which may be wired, wireless, or both. For example, the network interface circuitry may be configured to communicate via a wired local area network, a wireless local area network (e.g., via WiFi), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth or WiFi Direct), etc. In various embodiments, the network interface circuitry may provide device 1700 with connectivity to various types of other devices and networks.

Example Applications

Figure 18:
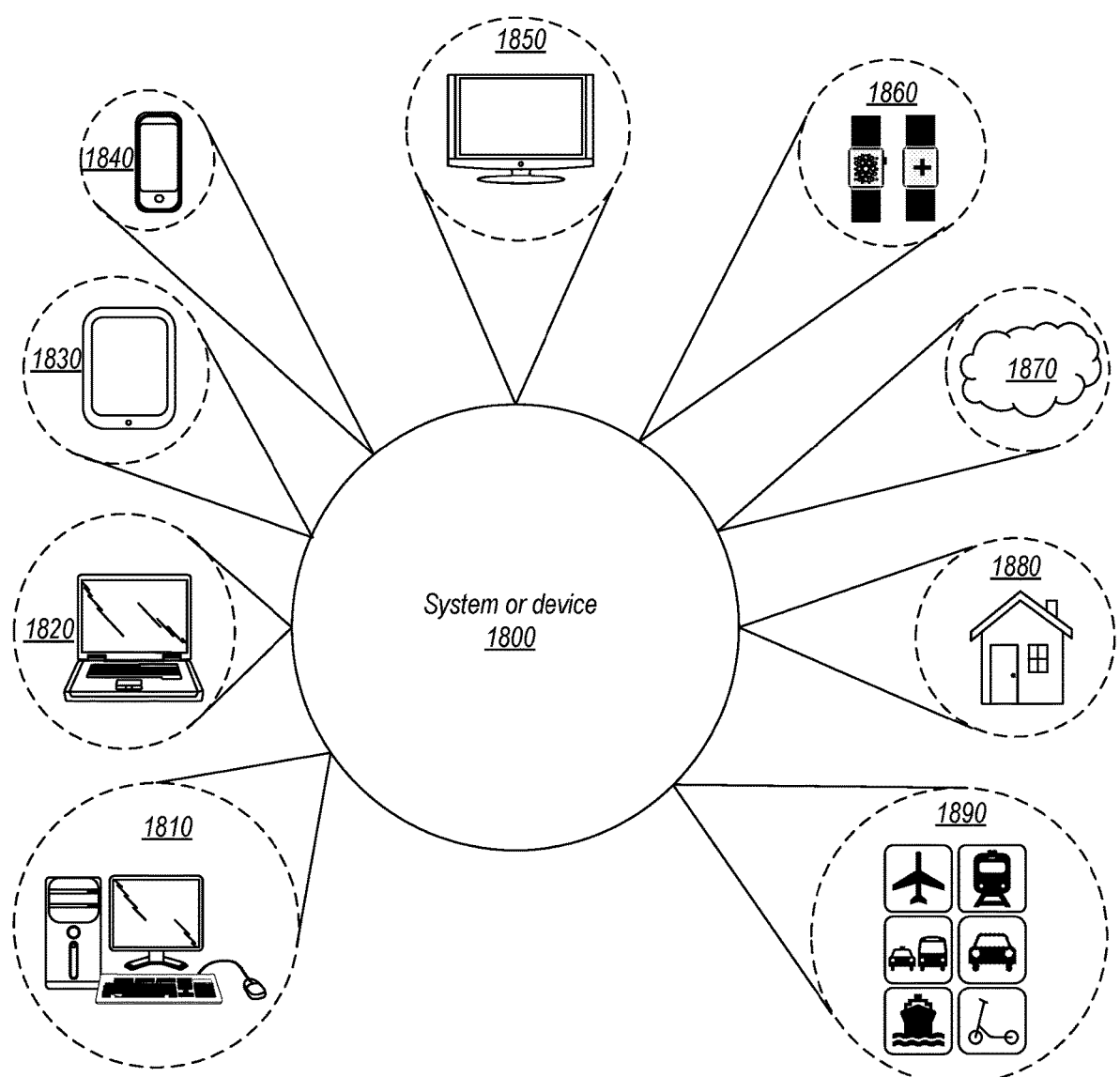
FIG. 18 is a diagram illustrating example applications of disclosed systems and devices, according to some embodiments.

Turning now to FIG. 18, various types of systems that may include any of the circuits, devices, or system discussed above. System or device 1800, which may incorporate or otherwise utilize one or more of the techniques described herein, may be utilized in a wide range of areas. For example, system or device 1800 may be utilized as part of the hardware of systems such as a desktop computer 1810, laptop computer 1820, tablet computer 1830, cellular or mobile phone 1840, or television 1850 (or set-top box coupled to a television).

Similarly, disclosed elements may be utilized in a wearable device 1860, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 1800 may also be used in various other contexts. For example, system or device 1800 may be utilized in the context of a server computer system, such as a dedicated server or on shared hardware that implements a cloud-based service 1870. Still further, system or device 1800 may be implemented in a wide range of specialized everyday devices, including devices 1880 commonly found in the home such as refrigerators, thermostats, security cameras, etc. The interconnection of such devices is often referred to as the "Internet of Things" (IoT). Elements may also be implemented in various modes of transportation. For example, system or device 1800 could be employed in the control systems, guidance systems, entertainment systems, etc. of various types of vehicles 1890.

The applications illustrated in FIG. 18 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that programs a computing system to generate a simulation model of the hardware circuit, programs a fabrication system configured to produce hardware (e.g., an integrated circuit) that includes the disclosed circuitry, etc. Claims to such a storage medium are intended to cover, for example, an entity that produces a circuit design, but does not itself perform complete operations such as: design simulation, design synthesis, circuit fabrication, etc.

Figure 19:
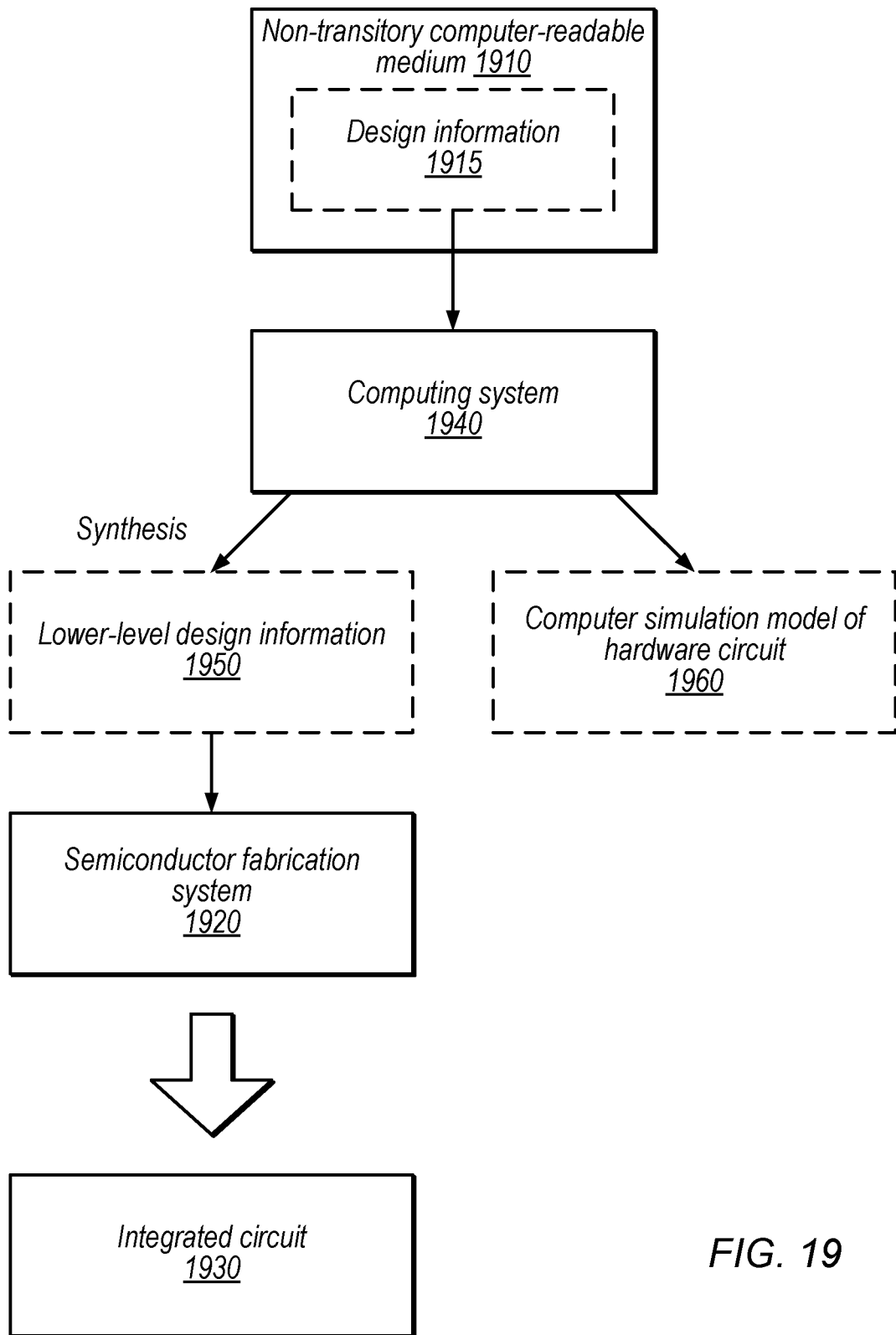
FIG. 19 is a block diagram illustrating an example computer-readable medium that stores circuit design information, according to some embodiments.

FIG. 19 is a block diagram illustrating an example non-transitory computer-readable storage medium that stores circuit design information, according to some embodiments. In the illustrated embodiment, computing system 1940 is configured to process the design information. This may include executing instructions included in the design information, interpreting instructions included in the design information, compiling, transforming, or otherwise updating the design information, etc. Therefore, the design information controls computing system 1940 (e.g., by programming computing system 1940) to perform various operations discussed below, in some embodiments.

In the illustrated example, computing system 1940 processes the design information to generate both a computer simulation model of a hardware circuit 1960 and lower-level design information 1950. In other embodiments, computing system 1940 may generate only one of these outputs, may generate other outputs based on the design information, or both. Regarding the computing simulation, computing system 1940 may execute instructions of a hardware description language that includes register transfer level (RTL) code, behavioral code, structural code, or some combination thereof. The simulation model may perform the functionality specified by the design information, facilitate verification of the functional correctness of the hardware design, generate power consumption estimates, generate timing estimates, etc.

In the illustrated example, computing system 1940 also processes the design information to generate lower-level design information 1950 (e.g., gate-level design information, a netlist, etc.). This may include synthesis operations, as shown, such as constructing a multi-level network, optimizing the network using technology-independent techniques, technology dependent techniques, or both, and outputting a network of gates (with potential constraints based on available gates in a technology library, sizing, delay, power, etc.). Based on lower-level design information 1950 (potentially among other inputs), semiconductor fabrication system 1920 is configured to fabricate an integrated circuit 1930 (which may correspond to functionality of the simulation model 1960). Note that computing system 1940 may generate different simulation models based on design information at various levels of description, including information 1950, 1915, and so on. The data representing design information 1950 and model 1960 may be stored on medium 1910 or on one or more other media.

In some embodiments, the lower-level design information 1950 controls (e.g., programs) the semiconductor fabrication system 1920 to fabricate the integrated circuit 1930. Thus, when processed by the fabrication system, the design information may program the fabrication system to fabricate a circuit that includes various circuitry disclosed herein.

Non-transitory computer-readable storage medium 1910, may comprise any of various appropriate types of memory devices or storage devices. Non-transitory computer-readable storage medium 1910 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1910 may include other types of non-transitory memory as well or combinations thereof. Accordingly, non-transitory computer-readable storage medium 1910 may include two or more memory media; such media may reside in different locations—for example, in different computer systems that are connected over a network.

Design information 1915 may be specified using any of various appropriate computer languages, including hardware description languages such as, without limitation: VHDL, Verilog, SystemC, SystemVerilog, RHDL, M, MyHDL, etc. The format of various design information may be recognized by one or more applications executed by computing system 1940, semiconductor fabrication system 1920, or both. In some embodiments, design information may also include one or more cell libraries that specify the synthesis, layout, or both of integrated circuit 1930. In some embodiments, the design information is specified in whole or in part in the form of a netlist that specifies cell library elements and their connectivity. Design information discussed herein, taken alone, may or may not include sufficient information for fabrication of a corresponding integrated circuit. For example, design information may specify the circuit elements to be fabricated but not their physical layout. In this case, design information may be combined with layout information to actually fabricate the specified circuitry.

Integrated circuit 1930 may, in various embodiments, include one or more custom macrocells, such as memories, analog or mixed-signal circuits, and the like. In such cases, design information may include information related to included macrocells. Such information may include, without limitation, schematics capture database, mask design data, behavioral models, and device or transistor level netlists. Mask design data may be formatted according to graphic data system (GDSII), or any other suitable format.

Semiconductor fabrication system 1920 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1920 may also be configured to perform various testing of fabricated circuits for correct operation.

In various embodiments, integrated circuit 1930 and model 1960 are configured to operate according to a circuit design specified by design information 1915, which may include performing any of the functionality described herein. For example, integrated circuit 1930 may include any of various elements shown in FIGS. 1, 4-8, 11, and 12. Further, integrated circuit 1930 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components. Similarly, stating "instructions of a hardware description programming language" that are "executable" to program a computing system to generate a computer simulation model" does not imply that the instructions must be executed in order for the element to be met, but rather specifies characteristics of the instructions. Additional features relating to the model (or the circuit represented by the model) may similarly relate to characteristics of the instructions, in this context. Therefore, an entity that sells a computer-readable medium with instructions that satisfy recited characteristics may provide an infringing product, even if another entity actually executes the instructions on the medium.

Note that a given design, at least in the digital logic context, may be implemented using a multitude of different gate arrangements, circuit technologies, etc. As one example, different designs may select or connect gates based on design tradeoffs (e.g., to focus on power consumption, performance, circuit area, etc.). Further, different manufacturers may have proprietary libraries, gate designs, physical gate implementations, etc. Different entities may also use different tools to process design information at various layers (e.g., from behavioral specifications to physical layout of gates).

Once a digital logic design is specified, however, those skilled in the art need not perform substantial experimentation or research to determine those implementations. Rather, those of skill in the art understand procedures to reliably and predictably produce one or more circuit implementations that provide the function described by the design information. The different circuit implementations may affect the performance, area, power consumption, etc. of a given design (potentially with tradeoffs between different design goals), but the logical function does not vary among the different circuit implementations of the same circuit design.

In some embodiments, the instructions included in the design information instructions provide RTL information (or other higher-level design information) and are executable by the computing system to synthesize a gate-level netlist that represents the hardware circuit based on the RTL information as an input. Similarly, the instructions may provide behavioral information and be executable by the computing system to synthesize a netlist or other lower-level design information. The lower-level design information may program fabrication system 1920 to fabricate integrated circuit 1930.

The various techniques described herein may be performed by one or more computer programs. The term "program" is to be construed broadly to cover a sequence of instructions in a programming language that a computing device can execute. These programs may be written in any suitable computer language, including lower-level languages such as assembly and higher-level languages such as Python. The program may written in a compiled language such as C or C++, or an interpreted language such as JavaScript.

Program instructions may be stored on a "computer-readable storage medium" or a "computer-readable medium" in order to facilitate execution of the program instructions by a computer system. Generally speaking, these phrases include any tangible or non-transitory storage or memory medium. The terms "tangible" and "non-transitory" are intended to exclude propagating electromagnetic signals, but not to otherwise limit the type of storage medium. Accordingly, the phrases "computer-readable storage medium" or a "computer-readable medium" are intended to cover types of storage devices that do not necessarily store information permanently (e.g., random access memory (RAM)). The term "non-transitory," accordingly, is a limitation on the nature of the medium itself (i.e., the medium cannot be a signal) as opposed to a limitation on data storage persistency of the medium (e.g., RAM vs. ROM).

The phrases "computer-readable storage medium" and "computer-readable medium" are intended to refer to both a storage medium within a computer system as well as a removable medium such as a CD-ROM, memory stick, or portable hard drive. The phrases cover any type of volatile memory within a computer system including DRAM, DDR RAM, SRAM, EDO RAM, Rambus RAM, etc., as well as non-volatile memory such as magnetic media, e.g., a hard drive, or optical storage. The phrases are explicitly intended to cover the memory of a server that facilitates downloading of program instructions, the memories within any intermediate computer system involved in the download, as well as the memories of all destination computing devices. Still further, the phrases are intended to cover combinations of different types of memories.

In addition, a computer-readable medium or storage medium may be located in a first set of one or more computer systems in which the programs are executed, as well as in a second set of one or more computer systems which connect to the first set over a network. In the latter instance, the second set of computer systems may provide program instructions to the first set of computer systems for execution. In short, the phrases "computer-readable storage medium" and "computer-readable medium" may include two or more media that may reside in different locations, e.g., in different computers that are connected over a network.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

The invention claimed is:

1. An apparatus, comprising:
processor circuitry configured to execute control transfer instructions;
prediction circuitry configured to track directions of executed control transfer instructions, including to:
designate some control transfer instructions as being in a first category, including to designate, based a determination that execution of a first control transfer instruction in a first direction meets a threshold bias level, the first control transfer instruction as being in the first category; and
designate other control transfer instructions, that do not meet the threshold bias level in a given direction, as being in a second category;
trace cache circuitry configured to:
identify traces of instructions that satisfy a set of criteria, including:
a given trace includes at least one internal taken control transfer instruction;
a conditional control transfer instruction is allowed as an internal trace instruction only if it is designated as being in the first category; and
a control transfer instruction designated in the second category is allowed only as a last control transfer instruction of a given trace; and
store one or more identified traces; and
training circuitry for the trace cache circuitry, wherein the training circuitry is configured to:
buffer traces until they meet a usefulness threshold, including to implement rolling window buffering in which multiple partially-overlapping traces are buffered; and
validate entries in the trace cache circuitry for traces that meet the one or more criteria and the usefulness threshold, including to select one of the partially-overlapping traces for validation in the trace cache circuitry based on usefulness values of the partially-overlapping traces.

2. The apparatus of claim 1, wherein the first category includes only control transfer instructions that have always taken the given direction during execution over a time period.

3. The apparatus of claim 1, wherein the first category includes control transfer instructions that have taken the given direction at least a threshold ratio over a time period.

4. The apparatus of claim 1, further comprising:
filter control circuitry configured to handle a third category of control transfer instructions that correspond to a subset of the first category of control transfer instructions that do not meet a second threshold bias level, including to:
for a given internal control transfer instruction of the third category of in stored trace, adjust a counter in a first direction in response to the given internal control transfer instruction executing toward the next portion of the stored trace and adjust the counter in a second direction in response to the given internal control transfer instruction executing away from the next portion of the stored trace; and
prevent inclusion of the given internal control transfer instruction as an internal instruction of traces in the trace cache circuitry in response to the counter reaching a threshold in the second direction.

5. The apparatus of claim 1, wherein the prediction circuitry includes a biased predictor configured to generate predictions for the first category based on a bias table.

6. The apparatus of claim 1, further comprising:
stitch queue circuitry configured to generate traces for caching in the trace cache circuitry from multiple fetch groups retrieved from an instruction cache.

7. The apparatus of claim 1, wherein the prediction circuitry is configured to:

designate the first control transfer instruction as being in the first category in response to initial execution of the first control transfer instruction in the first direction; and maintain the designation for the first instruction at least until the first control transfer instruction has executed away from the first direction.

8. The apparatus of claim 7, wherein the training circuitry is configured to buffer fetch groups retrieved from an instruction cache and is configured not to buffer fetch groups retrieved from the trace cache circuitry.

9. The apparatus of claim 1, wherein the trace cache circuitry is configured to identify traces of instructions that satisfy the set of criteria cache after a decode stage of the processor circuitry.

10. The apparatus of claim 1, further comprising:
trace cache control circuitry configured to:
evict a trace from the trace cache circuitry; and
replace a trace in the trace cache circuitry with another trace according to a replacement policy.

11. The apparatus of claim 1, further comprising:
single-cycle next fetch predictor circuitry configured to predict a next fetch address following a trace, in response to a hit in the trace cache circuitry.

12. The apparatus of claim 1, wherein the prediction circuitry includes:
shared table circuitry configured to store a prediction table;
CTI predictor lane circuitry configured to access the prediction table to predict directions of multiple control transfer instructions in a given fetch group; and
trace predictor lane circuitry configured to access the prediction table to predict a direction of a trace-ending control transfer instruction in a trace cached by the trace cache circuitry.

13. The apparatus of claim 1, wherein the apparatus is a computing device that further includes:
a central processing unit;
a display; and
network interface circuitry.

14. A method, comprising:
tracking, by a processor, directions of executed control transfer instructions, including:
designating some control transfer instructions as being in a first category, including designating based on a determining that execution of a first control transfer instruction in a first direction meets a threshold bias level, the first control transfer instruction as being in the first category; and
designating other control transfer instructions, that do not meet the threshold bias level in a given direction, as being in a second category;
identifying, by the processor, traces of instructions that satisfy a set of criteria, including:
a given trace includes at least one internal taken control transfer instruction;
a conditional control transfer instruction is allowed as an internal trace instruction only if it is designated as being in the first category; and
a control transfer instruction designated in the second category is allowed as a last control transfer instruction of a given trace;
storing, by the processor, one or more identified traces;
buffering, by the processor, traces until they meet a usefulness threshold, using rolling window buffering in which multiple partially-overlapping traces are buffered; and validating entries for traces that meet the one or more criteria and the usefulness threshold, including selecting one of the partially-overlapping traces for validation based on usefulness values of the partially-overlapping traces.

15. The method of claim 14, wherein the first category includes only control transfer instructions that have always taken the given direction during execution over a time period.

16. The method of claim 14, wherein:
the designating the first control transfer instruction as being in the first category is performed in response to initial execution of the first control transfer instruction in the first direction; and
the designation for the first instruction is maintained at least until the first control transfer instruction has executed away from the first direction.

17. The method of claim 14, wherein the identifying includes stitching traces for caching in a trace cache from multiple fetch groups retrieved from an instruction cache.

18. A non-transitory computer-readable medium having instructions of a hardware description programming language stored thereon that, when processed by a computing system, program the computing system to generate a computer simulation model, wherein the model represents a hardware circuit that includes:
processor circuitry configured to execute control transfer instructions;
prediction circuitry configured to track directions of executed control transfer instructions, including to:
designate some control transfer instructions as being in a first category, including to designate, based a determination that execution of a first control transfer instruction in a first direction meets a threshold bias level, the first control transfer instruction as being in the first category; and
designate other control transfer instructions, that do not meet the threshold bias level in a given direction, as being in a second category;
trace cache circuitry configured to:
identify traces of instructions that satisfy a set of criteria, including:
a given trace includes at least one internal taken control transfer instruction;
a conditional control transfer instruction is allowed as an internal trace instruction only if it is designated as being in the first category; and
a control transfer instruction designated in the second category is allowed only as a last control transfer instruction of a given trace; and
store one or more identified traces; and
training circuitry for the trace cache circuitry, wherein the training circuitry is configured to:
buffer traces until they meet a usefulness threshold, including to implement rolling window buffering in which multiple partially-overlapping traces are buffered; and
validate entries in the trace cache circuitry for traces that meet the one or more criteria and the usefulness threshold, including to select one of the partially-overlapping traces for validation in the trace cache circuitry based on usefulness values of the partially-overlapping traces.

19. The non-transitory computer-readable medium of claim 18, wherein the first category includes only control transfer instructions that have always taken the given direction during execution over a time period.

\* \* \* \* \*